US007111389B2

(12) United States Patent
Cooper et al.

(10) Patent No.: US 7,111,389 B2
(45) Date of Patent: Sep. 26, 2006

(54) APPARATUS FOR ADHERING A CLAMP TO A HOSE

(75) Inventors: Ray Cooper, Morehead, KY (US); Joseph P. Zakrzewski, Mount Sterling, KY (US); Chad A. Fackler, Deshler, OH (US)

(73) Assignee: Cooper Technology Services, LLC, Findlay, OH (US)

( * ) Notice: Subject to any disclaimer, the term of this patent is extended or adjusted under 35 U.S.C. 154(b) by 402 days.

(21) Appl. No.: 10/182,171

(22) PCT Filed: Jan. 26, 2001
(Under 37 CFR 1.47)

(86) PCT No.: PCT/US01/02535

§ 371 (c)(1),
(2), (4) Date: Aug. 15, 2003

(87) PCT Pub. No.: WO01/54859

PCT Pub. Date: Aug. 2, 2001

(65) Prior Publication Data
US 2004/0025318 A1    Feb. 12, 2004

Related U.S. Application Data

(60) Provisional application No. 60/178,509, filed on Jan. 28, 2000.

(51) Int. Cl.
*B23P 21/00* (2006.01)
*B23P 23/00* (2006.01)
*B23P 19/02* (2006.01)

(52) U.S. Cl. .................. 29/771; 29/564.1; 29/235; 29/566

(58) Field of Classification Search .............. 29/700, 29/450, 235, 237, 458, 771, 564.1, 566; 81/9.3; 285/242–259; 100/29, 30; 24/19, 20 R; 138/99
See application file for complete search history.

(56) References Cited

U.S. PATENT DOCUMENTS 3,360,846 A * 1/1968 Schellstede .................. 29/447

(Continued)

FOREIGN PATENT DOCUMENTS

| JP | 58-211836 | 12/1983 |
|---|---|---|
| JP | 08-132324 | 5/1996 |
| JP | 09-168929 | 6/1997 |

*Primary Examiner*—David P. Bryant
*Assistant Examiner*—Douglas E. Mazzuca, Jr.
(74) *Attorney, Agent, or Firm*—Carlson, Gaskey & Olds

(57) ABSTRACT

An apparatus for attaching a clamp to a hose assembly, preferably automatic or semi-automatic, incorporates precisely located mounting devices for receiving clamp tooling, cooperating hose guiding and positioning tooling which can support a unique hose assembly and locate a predetermined location on such hose assembly properly aligned with a clamp in the clamp tooling. An operator only needs to load a clamp and a hose assembly into tooling, then initiate an automatic cycle which scrubs a small area on the hose, places a predetermined quantity (e.g. drop) of adhesive on that area, then brings the clamp into position and presses the clamp, adhesive, and hose together holding that position for a period sufficient to allow the adhesive to set. The operator then removes the finished part (the hose with attached clamp) and loads another clamp and hose into the tooling. The cycle optionally may terminate at the point where the adhesive is to be applied, that function then is initiated by an operator, and the cycle completed under automatic control. Interchangeable tooling provides quick setup in changing from one job to another, involving different sizes and/or types of clamps, and different sizes and shape of hose assemblies which require attachment of a clamp thereto.

19 Claims, 23 Drawing Sheets

U.S. PATENT DOCUMENTS 3,406,905 A * 10/1968 Reilly et al. .................. 239/84
3,938,237 A    2/1976 Dunz
4,122,733 A * 10/1978 Ott et al. ...................... 81/9.3
4,899,428 A * 2/1990 Hsu ............................. 29/235
5,145,218 A * 9/1992 Worley et al. .............. 285/243
5,675,871 A * 10/1997 Webb et al. ................ 24/20 R

* cited by examiner

APPARATUS FOR ADHERING A CLAMP TO A HOSE

RELATED APPLICATION

This application is related to U.S. Provisional Patent Application Ser. No. 60/178,509 filed 28 Jan. 2000.

BACKGROUND OF THE INVENTION

This invention relates to apparatus to be utilized by an operator in an automated process of adhering a clamp, normally a circular metal clamp, to a tubular hose. In a production facility it is necessary to be able to precisely locate the hose end, scrub/roughen (e.g. prepare) a spot on the end region of the hose to which a clamp will be secured, place a metered amount of quick-setting adhesive on that region, move a clamp into precise position spaced from the adhesive and then press the clamp into position while the adhesive sets. The apparatus for accomplishing these steps must be precise, simple to use (e.g. to load and unload the clamps and hose), and have capability to accommodate a substantial variety of hose pieces and clamps with simple change of type specific tooling.

U.S. Pat. No. 5,145,218 discloses a hose construction and method of making. A toggle clamping means is directly glued to the hose by a single spot of adhesive disposed between the clamping means and the hose. Japanese patent number 58211836 also discloses a clamping means secured to a hose.

SUMMARY OF THE INVENTION

An apparatus for precisely locating a uniquely shaped hose assembly for attachment of a clamp thereto at a predetermined attachment location on the hose assembly comprises clamp tooling adapted to orient a hose clamp including means for receiving a hose clamp and presenting the clamp in a predetermined attachment position, a mounting device for receiving said clamp tooling, cooperating hose positioning tooling adapted to support a unique hose assembly properly aligned with a clamp presented at the predetermined attachment position, said hose positioning tooling being designed to locate the hose assembly with its attachment location aligned with a clamp in said clamp tooling, and means for pressing together the clamp and the hose assembly at the attachment location while the adhesive sets, characterized in that the apparatus further includes means for scrubbing the attachment location on the hose assembly, means for depositing a measured quantity of adhesive to the attachment location, and means associated with said clamp tooling for moving a clamp therein into engagement with the deposited adhesive at the attachment location on the supported hose assembly.

DESCRIPTION OF THE PREFERRED EMBODIMENT

Figure 1:
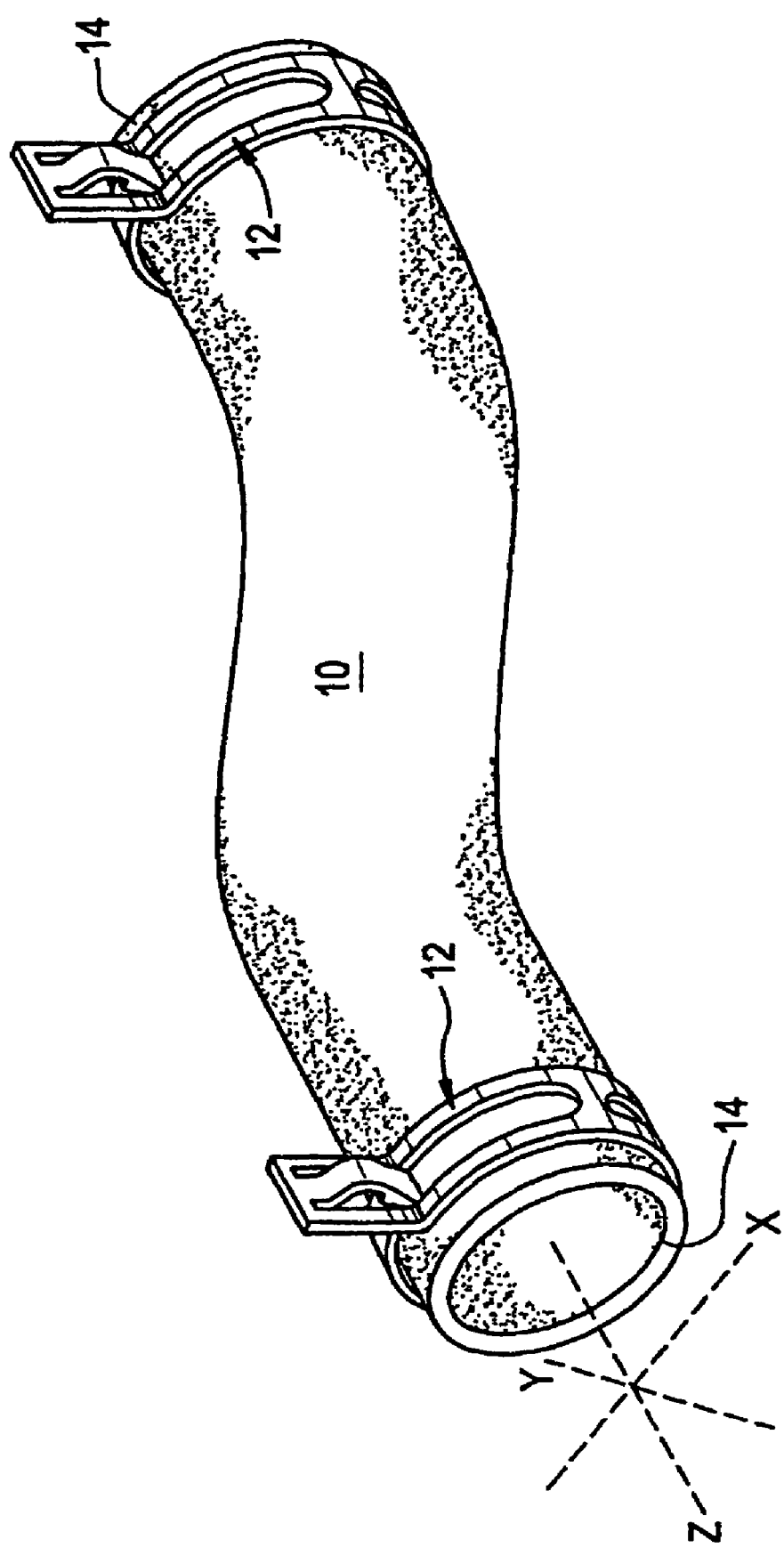
FIG. 1 illustrates a typical hose & clamp assembly which is combined using the apparatus of invention.

Referring to FIG. 1, a length of shaped tubing, specifically a shaped flexible rubber hose 10, is fitted with metal clamp(s) 12 at predetermined spacings from one or more of its opposite ends 14. The invention is applicable to hose or tubing of various sizes, shapes and materials (hereinafter identified as a hose assembly), may include branches so an assembly has more than two ends, and the clamps may be metallic or other equivalent material and may be fitted to one or more ends of the hose assembly. The clamps 10 illustrated are of a well known pre-tensioned type which are latched in an open position prior to attachment to the hose. The clamps are usually released in later assembly operations when the ends of the tubing and clamp assembly are placed on ferrules or other connectors, so as to clamp the hose in that end position. Again, other types of clamps can be fitted to hose assemblies with the apparatus of this invention.

The tubing or hose can have various inner and outer diameters, and various bends or curves which are unique to the intended installation of the completed hose assembly with attached clamp. It is important that the clamps be properly spaced at a predetermined distance from the end of the hose to which it is attached, and tat the clamp be in proper circular orientation with respect to the shape of the hoses or tubes making up the assembly. This assures that the clamp will be positioned over a ferrule or connector, and at a predetermined angular orientation, when it is installed in its intended environment to allow convenient release or operation of the clamp mechanism. Thus, it will be apparent that each hose and clamp assembly has a unique set of parameters for the alignment of clamp and hose before the clamp is adhered to the hose end.

Figure 2:
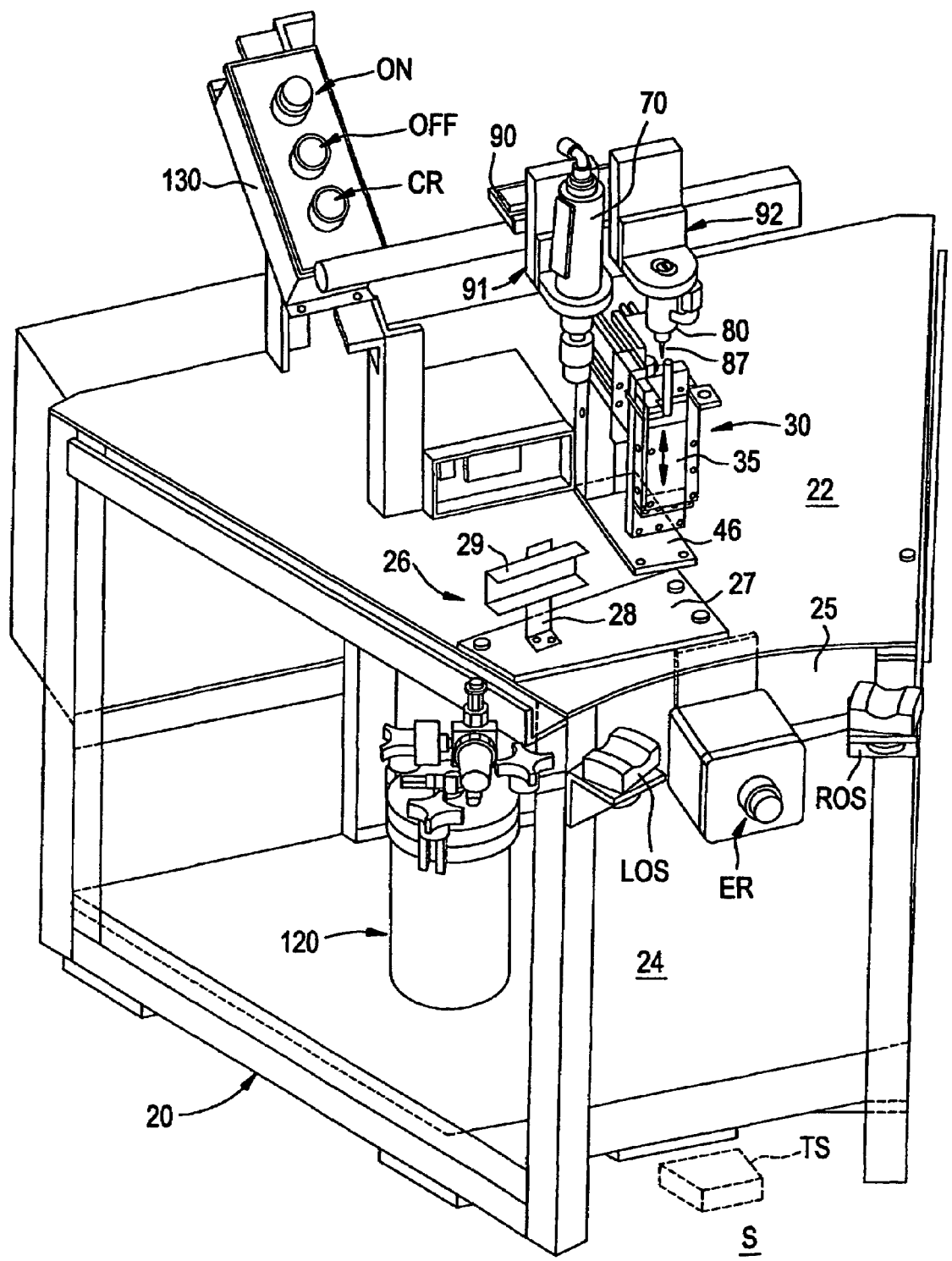
FIG. 2 is a frontal perspective view of a preferred embodiment of the apparatus.
Figure 3:
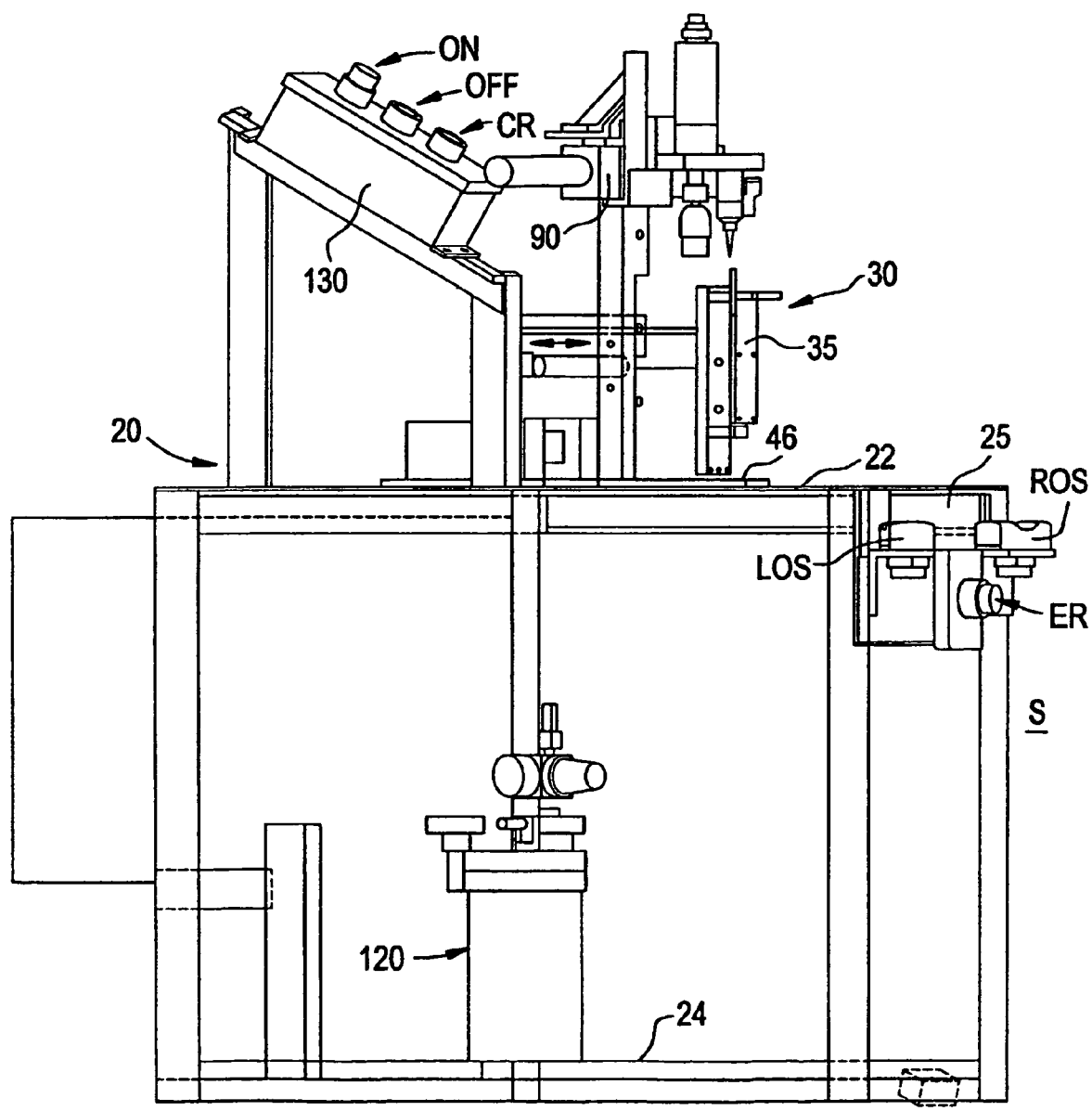
FIG. 3 is a side view of the apparatus.

The overall apparatus for carrying out the automated operation of locating or indexing and preparing the hose end for adhesive application, and for locating a clamp in a properly aligned orientation and position, is illustrated in FIGS. 2 & 3. A table 20 has a top 22 and a lower shelf 24. The table is preferably of a somewhat wedge shape in plan view, with the forward end 25 of top 22 located at an operator's station S.

Figure 4A:
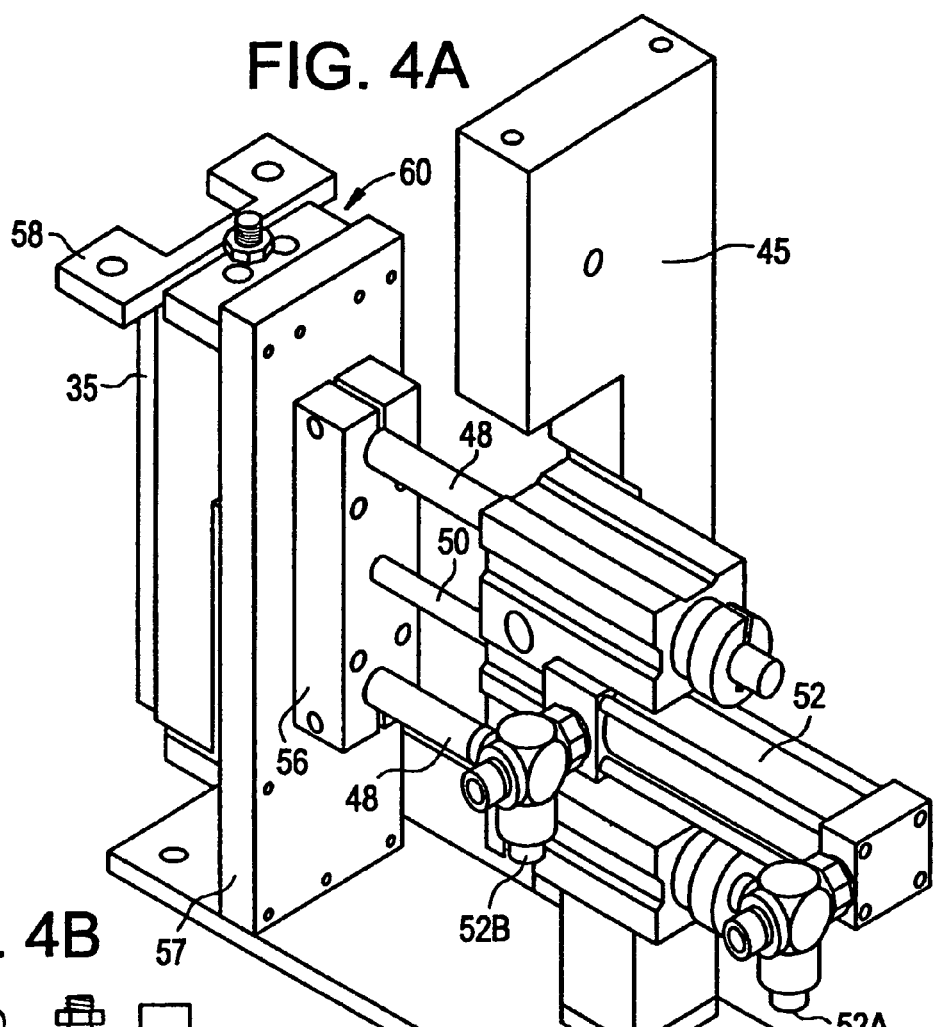
FIG. 4A is an enlarged perspective view, taken from the right and rear as viewed in FIG. 1.
Figure 4B:
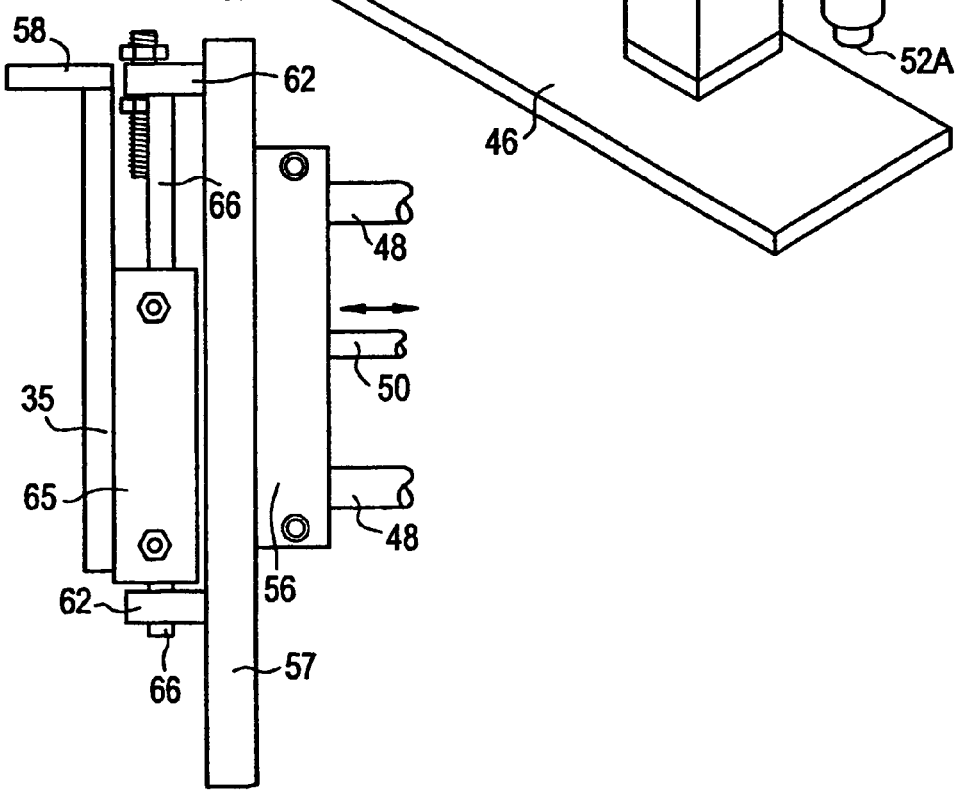
FIG. 4B is a partial side view, showing details of the supports for the tooling.
Figure 5:
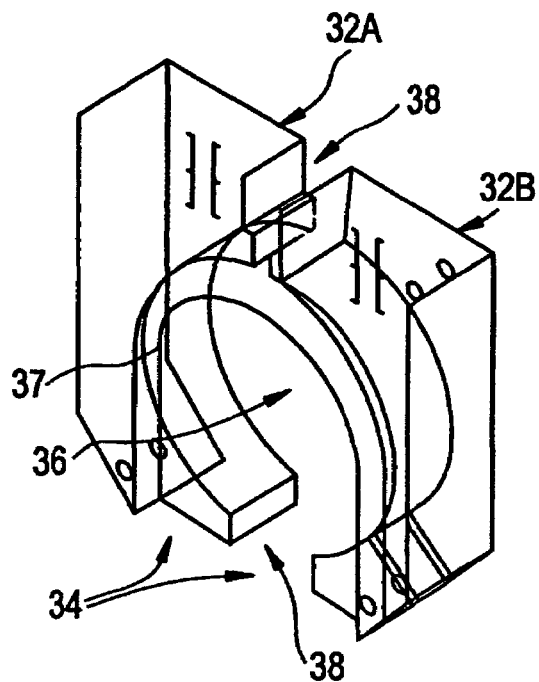
FIG. 5 is an enlarged perspective view of the tooling for holding a clamp and an end of a hose assembly to index the same.
Figure 6:
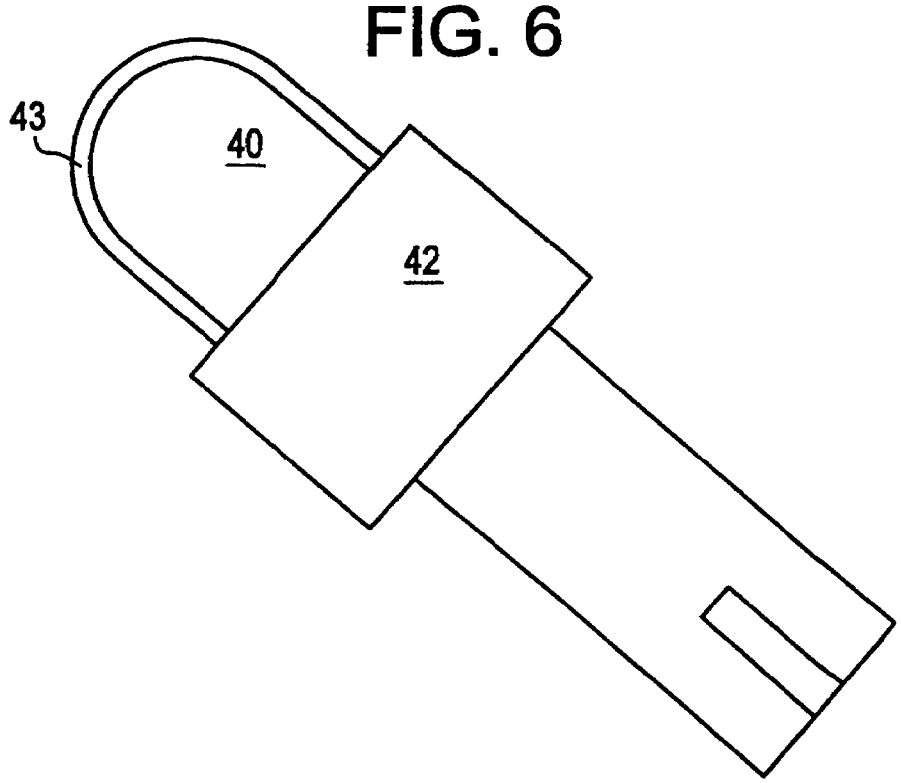
FIG. 6 is a side view of a hose end position tool or mandrel which cooperates with tooling shown in FIG. 5.

Supported in the middle of table top 20 is a tool holder 30 which is adapted to receive various tooling which locates and supports a ring-like clamp to be attached, and also defines the receptor and indexer for a hose end. Typical such
} tooling is shown in FIGS. 4–6. Forward of the tool holder is a hose locating tool 26 (FIG. 2) which is a part of the interchangeable tooling, and comprising an index base 27 secured to top 22, an upward extending stand 28, and a hose receptor 29. Parts 28 and 29 are of unique shape and dimension according to the size, shape, and predetermined positioning of the hose in the apparatus.

FIG. 5 shows the opposing sections 32A and 32B of a clamp receiver and carrier 34 which is supported on a movable plate 35 (FIGS. 4A & B), and defines through the middle of carrier 34 a central cylindrical opening 36 having a counterbored opening 37 for receiving the periphery of a clamp such as shown in FIG. 1, and having upper and lower gaps 38 to embrace the clamp. Plate 35 is part of the tooling support and actuation shown in FIGS. 4A & 4B as viewed from the back and side of table 20.

FIG. 6 illustrates the mandrel 40 and its surrounding stop ring 42 which mounts upon, and extends forward from, the rear vertical post 45 projecting upward from the base plate 46 of the tooling support structure, which base plate is secured to table top 22. The nose 43 of mandrel 40 receives the open end of a hose and stop ring 42 defines an index point for positioning the hose end along its length, that is, along the Z axis of the hose end, by pushing the hose end against the stop ring.

A horizontal positioning mechanism is supported on post 45, and includes a pair of guided slide rods 48 and a pneumatic cylinder 52. The rod 50 of cylinder 52 and the slide rods all extend forward to, and terminate in, the rear of a horizontally movable block 56. Together these parts are the major parts of a reciprocating mechanism 54 carrying the main support plate 57 which extends upward above (and free from) base plate 46. Block 56 is fastened to the back of a horizontally movable plate 57 of the clamping mechanism 60 which carries movable plate 35. A bracket 58 at the top of plate 35 provides the attachment and support for the sections 32A, 32B of the clamp receiver with openings 36, 37 surrounding mandrel 40.

The clamping mechanism 60 comprises the front plate 35, which is attached to a vertically acting pneumatic cylinder 65 having its rod ends 66 connected between upper and lower brackets 62 projecting forward from plate 57. The body of cylinder 65 is attached to front plate 35. Actuation of cylinder 65 causes limited vertical motion of plate 35 and the attached sections 32A, 32B of the clamp receiver 32, between an upper position clear of the end of a hose on mandrel 40 (before a spot of adhesive is applied to the hose end), and a lower clamping position wherein the clamp is pressed against the glue spot on the hose end.

In this function, the sections 32A, 32B have a clamping action against the hose end, and the mandrel 40 functions as an anvil supporting the inner portion of the hose end.

Air under pressure is supplied to the pneumatic cylinder 52 through ports connections 52A, 52B to pressurize and/or vent the opposite chambers of the cylinder and produce the forward/rearward motion of the tooling. Similarly, air under pressure is supplied to the appropriate chambers of cylinder 65 to produce the up/down action of the tooling.

Figure 7:
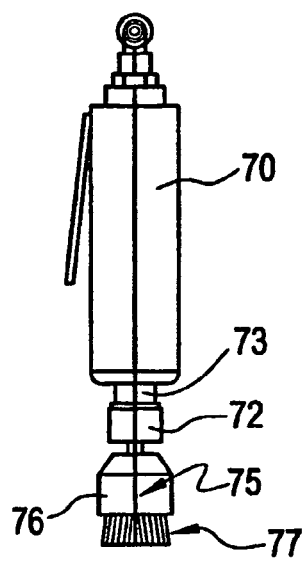
FIG. 7 is a side view of the scrubbing tool.

Referring to FIG. 7, the scrubbing tool is shown as a conventional in-line rotary pneumatic driver 70 having a collet 72 on its drive shaft 73 to hold the scrubbing tool 75. This tool comprises a base 76 and a frusto-conical wheel array of fibers 77. In an actual embodiment, the fibers are formed of carbon impregnated silicone strands.

Figure 8:
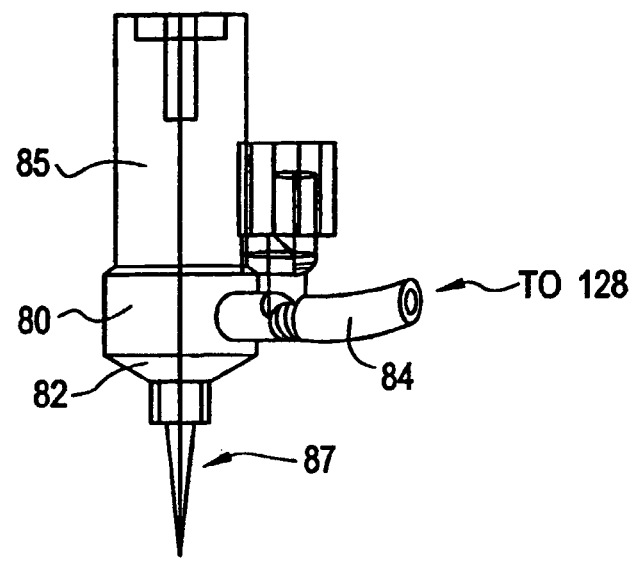
FIG. 8 is a side view of the adhesive dispenser.
Figure 9:
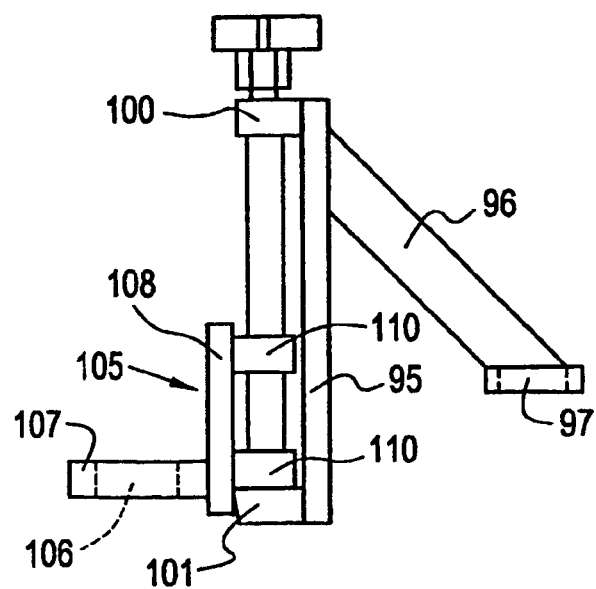
FIG. 9 is a side view of one of the height adjusting mechanisms which cooperate with the scrubbing tool shown in FIG. 7 and with the adhesive dispenser shown in FIG. 8.
Figure 10:
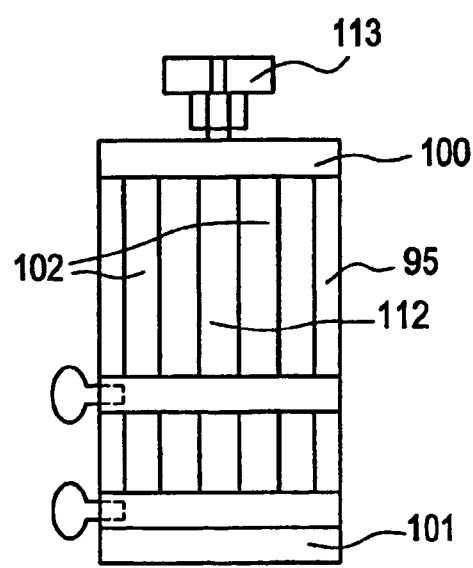
FIG. 10 is a front view of the height adjusting mechanism.
Figure 12:
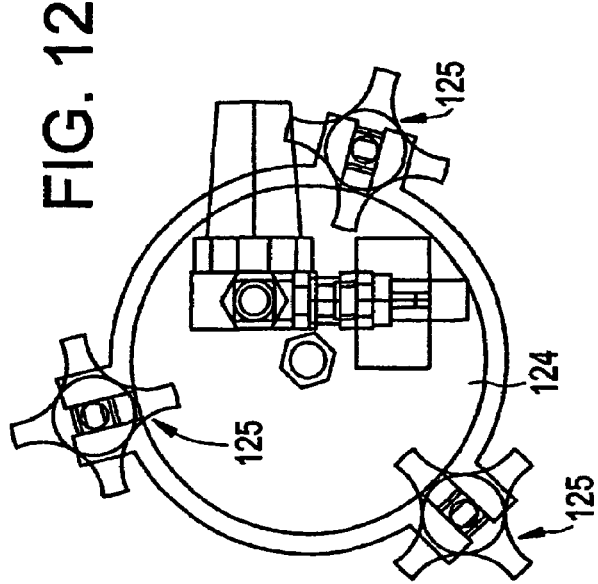
FIG. 12 is a top view of the adhesive supply container showing its removable top.
Figure 11:
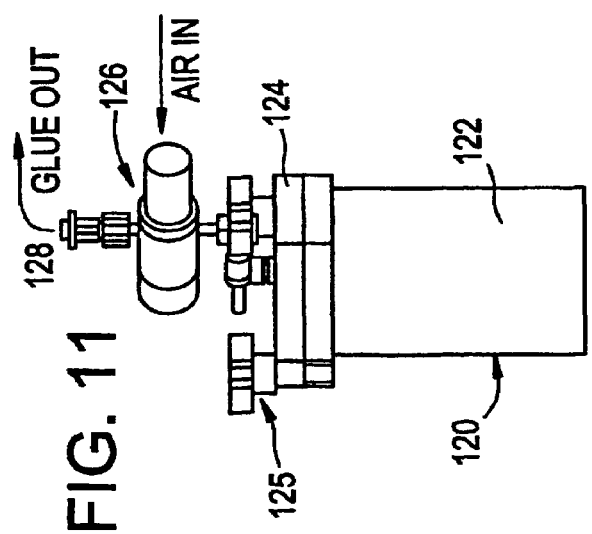
FIG. 11 is a side view of the adhesive supply container.

FIG. 8 shows the adhesive dispenser, in the form of a cylindrical body 80 with a cup-like part 82 at its bottom connected to an adhesive supply tube 84 extending from a source of adhesive under pressure (later described). A solenoid operated valve 85 controls flow from tube 84 into part 82, which in turn is fitted with a tapered nozzle 87 (preferably replaceable) from which a controlled quantity of adhesive is dispensed onto the end of a hose supported on mandrel 40.

The scrubbing tool and the adhesive dispenser are supported on a horizontally extending slide way 90 (FIGS. 2 & 3) above and extending transversely to mandrel 40. A pair of separate but similar support brackets 91 and 92 are mounted upon a slide way 94 (FIG. 3), spaced apart a predetermined distance such that one or the other can be located over the center of the clamp tooling, or at a center location where each is located on opposite sides of that center.

The support brackets 91, 92 each include a vertically extending back plate 95 and an arm 96 extending rearward and downward of plate 95 and having a horizontally extending slide 97 at its bottom, spaced rearwardly of plate 95. The lower portion of plate 95 and the bottom of slide 97 are mounted to slide way 90. Upper and lower blocks 100 and 101 extend forward from plate 95 and carry between them spaced apart vertically arranged rods 102 which form a guide for an L-shaped carrier bracket 105 which has a receiving/mounting aperture 106 in its horizontal section 107 that embraces and holds the dispenser body 80 (on one bracket) and the body 70 of the scrubber driver (in the other bracket).

The vertical section 108 of the carrier bracket has spaced apart cross-bars 110 which have appropriate holes for receiving rods 102 and forming a vertically adjustable restraint for bracket 105. A threaded rod 112 with an adjustment knob 113 extends through block 100 and is seated in block 101, and has a treaded connection to internal threads in one or both of cross-bars 110.

Rotation of knob 113 will cause raising or lowering of bracket 105 to set the operating level of the scrubbing tool 75 and the level of the adhesive dispensing nozzle 87.

Supported on shelf 24 is an enclosed adhesive reservoir 120 (FIGS. 2, 3, 11 & 12). This reservoir acts as the supply source for liquid adhesive, and comprises a closed body 122 including a removable cover 124 held in sealed relation to the body by several screw-type clamps 125. A compressed air fitting 126 is fitted to cover 124 to allow pressurizing the reservoir interior, and cover 124 includes a depending intake tube (not shown) which is connected to the bottom of an adhesive outlet fitting 127 and has a ferrule at it exterior for attachment of an adhesive supply tube 128 which leads to the dispenser body 80. In practice, it is preferred that the adhesive storage include an open top pot (not shown) set within reservoir body 122, into which the intake tube descends. Normal operating pressure in reservoir 120 is in the order of 5 p.s.I (351 gram force/cm$^2$).

Figure 13:
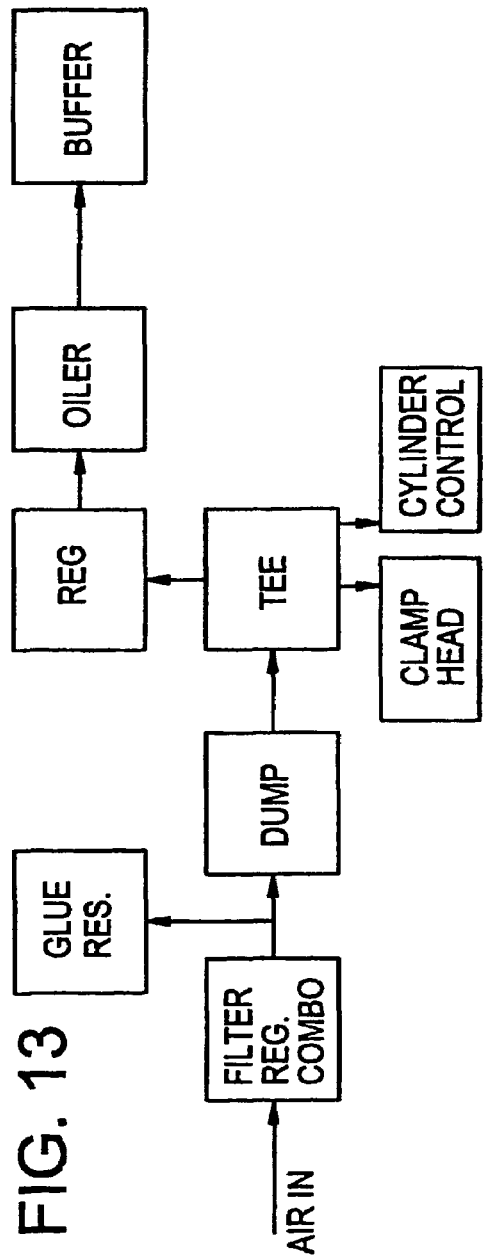
FIG. 13 is a schematic diagram of the pneumatic control system for the apparatus.

FIG. 13 illustrates schematically the pneumatics of the apparatus. The compressed air supply may be from any suitable source; in a manufacturing environment this often a "shop air" connection which supplies compressed air in sufficient volume at a pressure in the order of 90 p.s.i. (6327 gram force/cm$^2$). The inlet air is routed through a filter and pressure regulator module, and then to the adhesive (glue) reservoir 120 and through a dump valve module to a) a further regulator which has its output connected through an oiler to the buffer motor 70 and to the various pneumatic cylinders (previously described) including the clamping head.

The apparatus is semi-automated under the control of a digital microprocessor. In an actual embodiment, an Allen-Bradley Micrologix 1000 microprocessor is employed, as shown in FIG. 14.

Figure 14A:
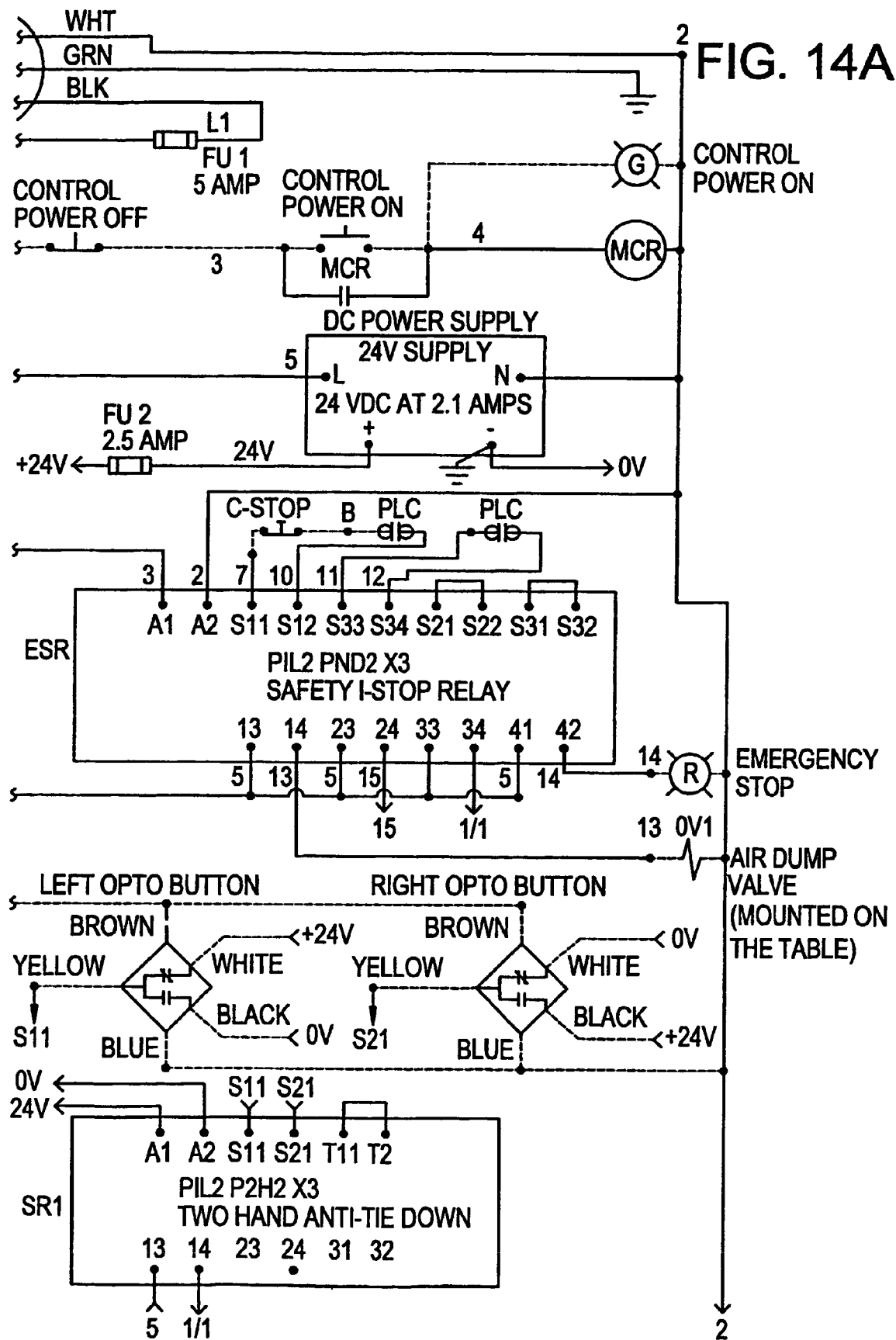
FIG. 14 comprises two electrical schematic diagrams, with notation, detailing the microprocessor control for the apparatus.
Figure 14B:
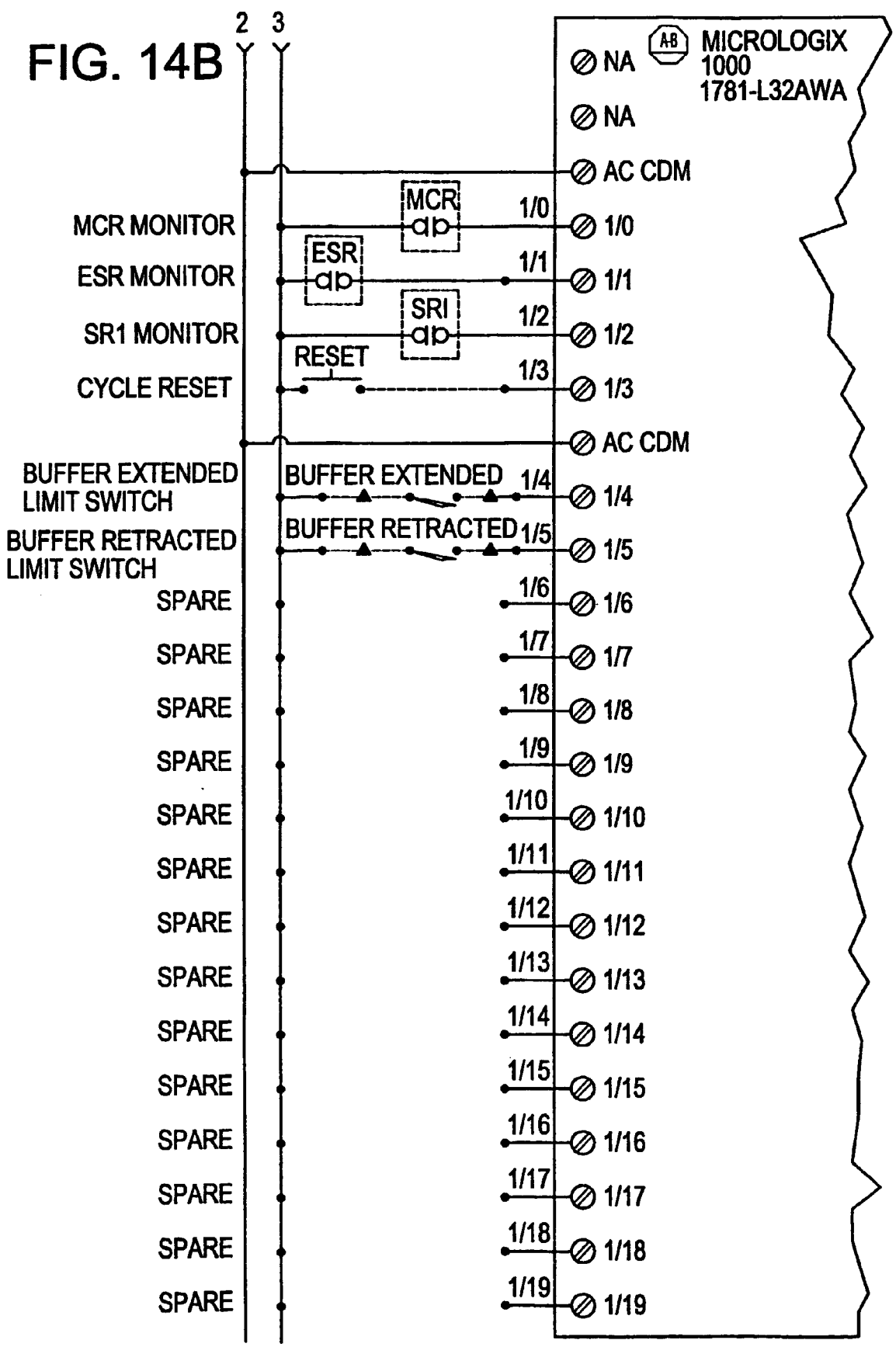
Figure 14C:
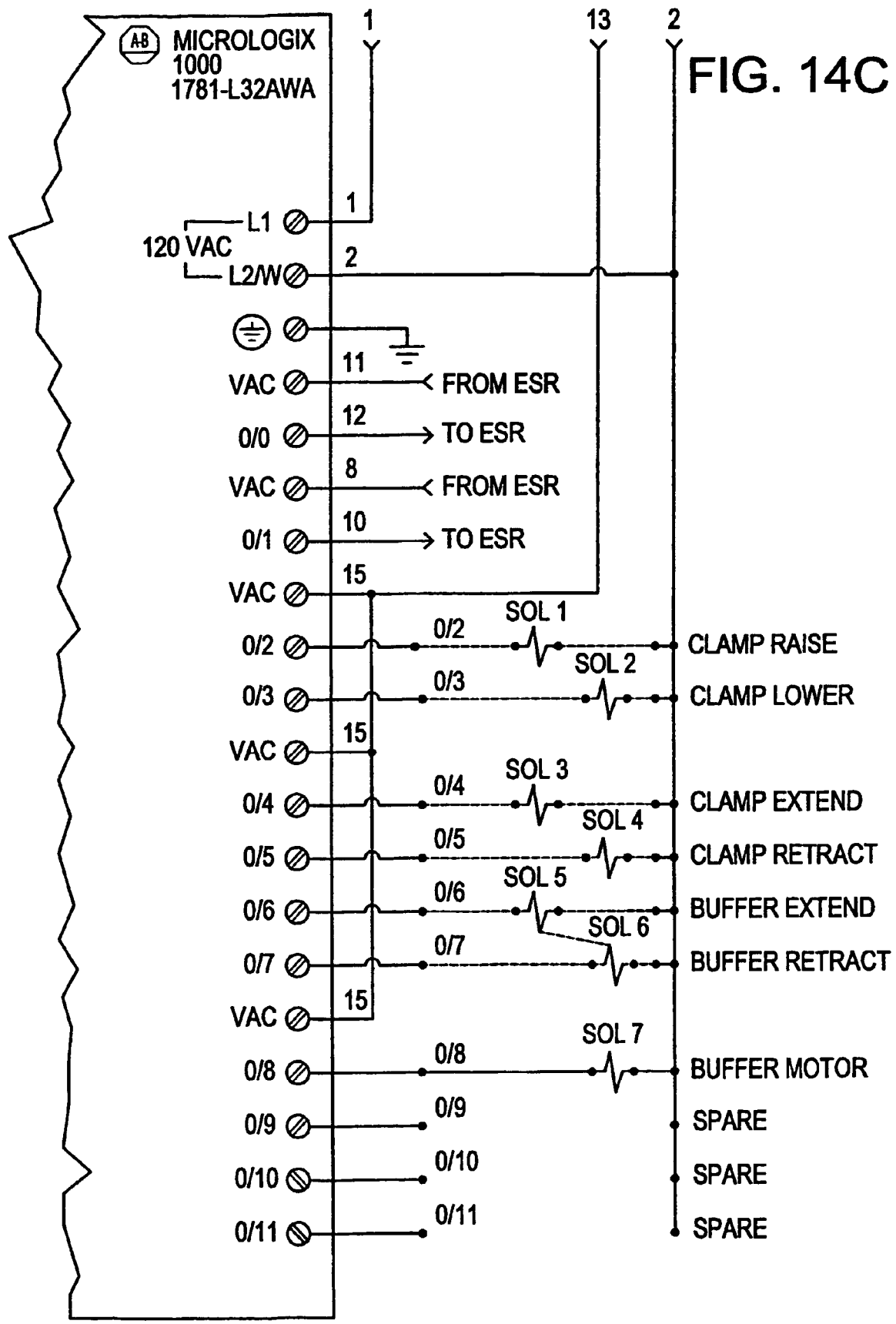
Figure 15A:
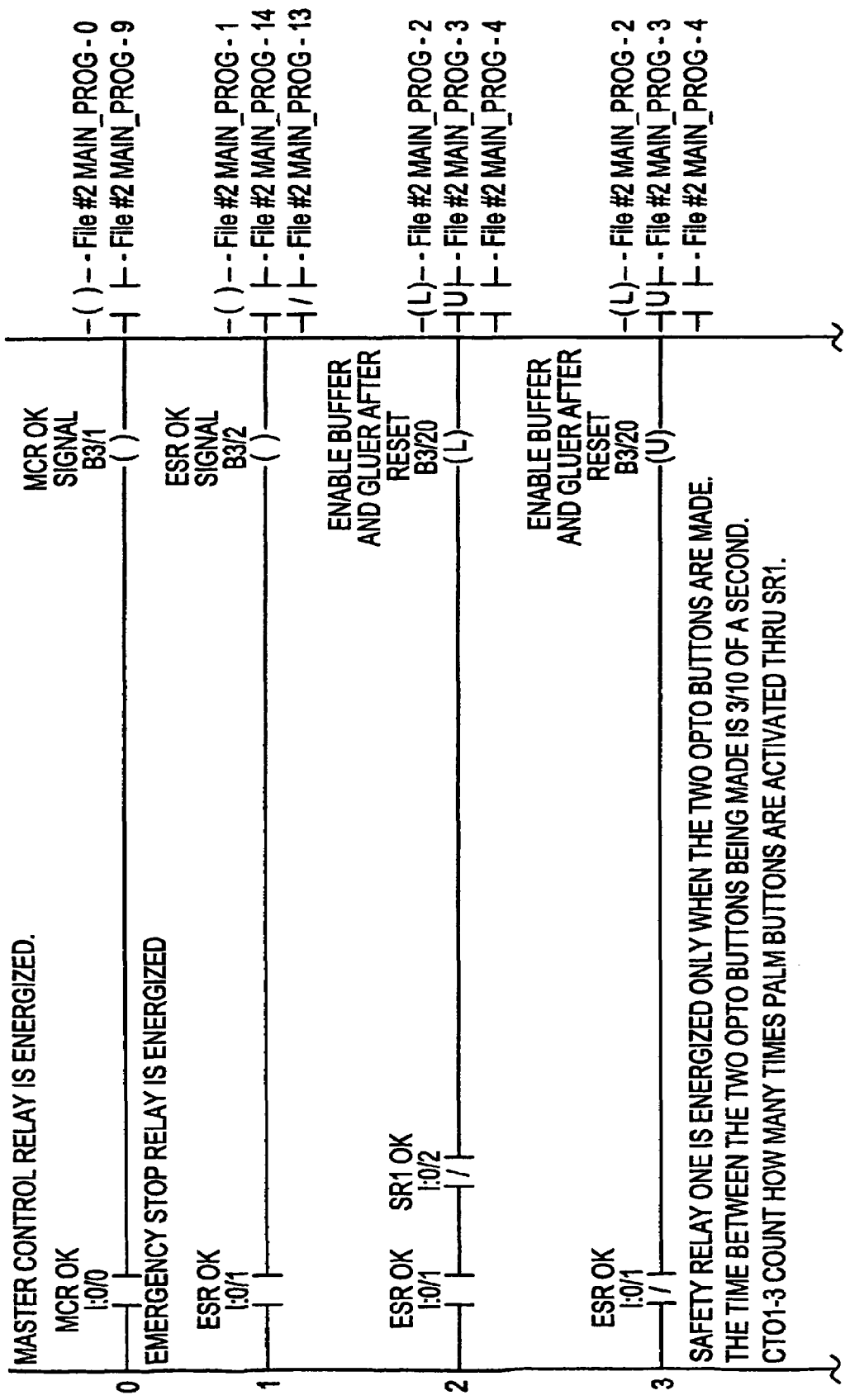
FIGS. 15–19 are the ladder logistics diagrams comprising the connections and instructions for the microprocessor control and the various switches, solenoids and position sensing switch contacts which make up the control system.
Figure 15B:
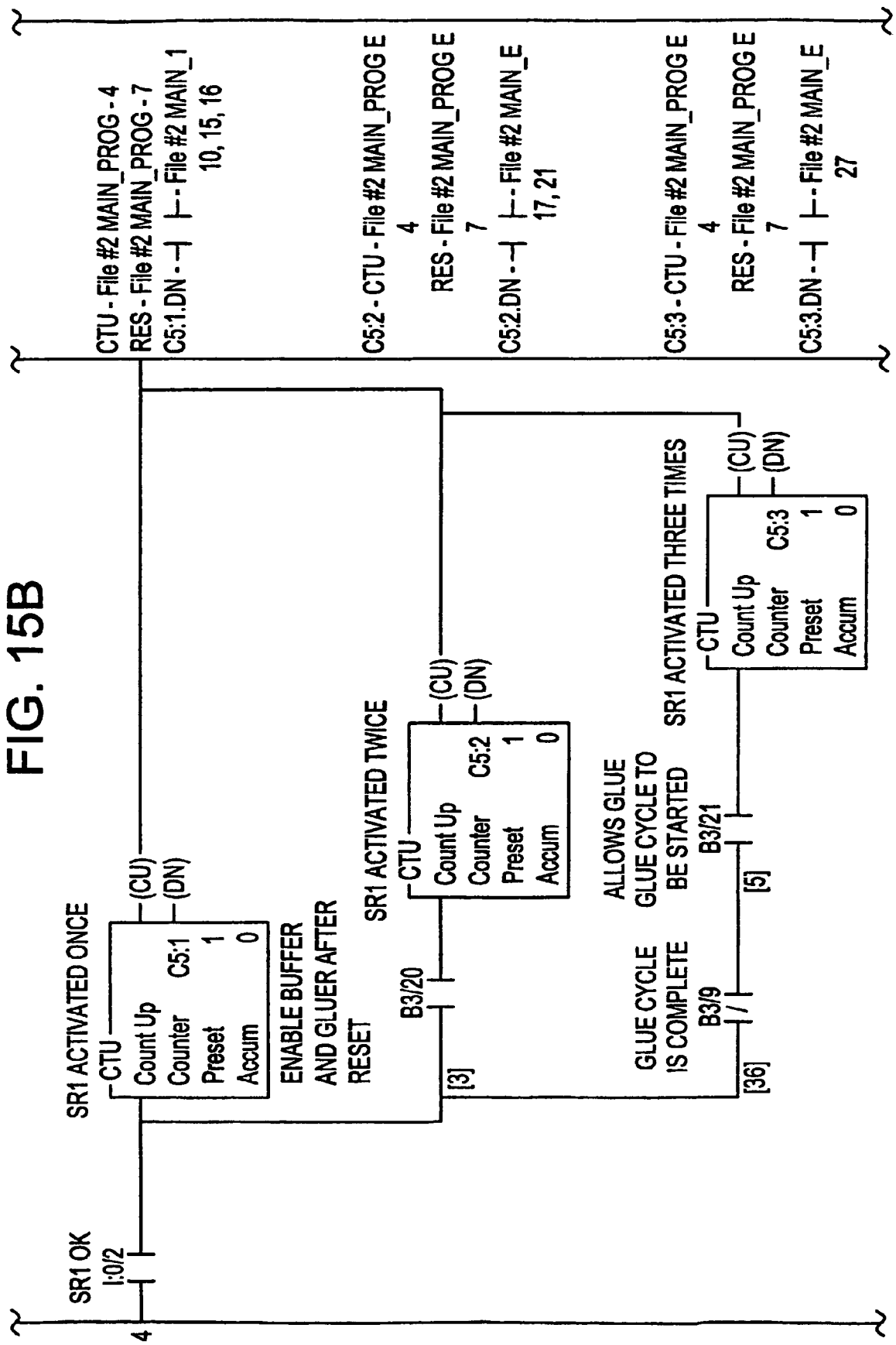
Figure 15C:
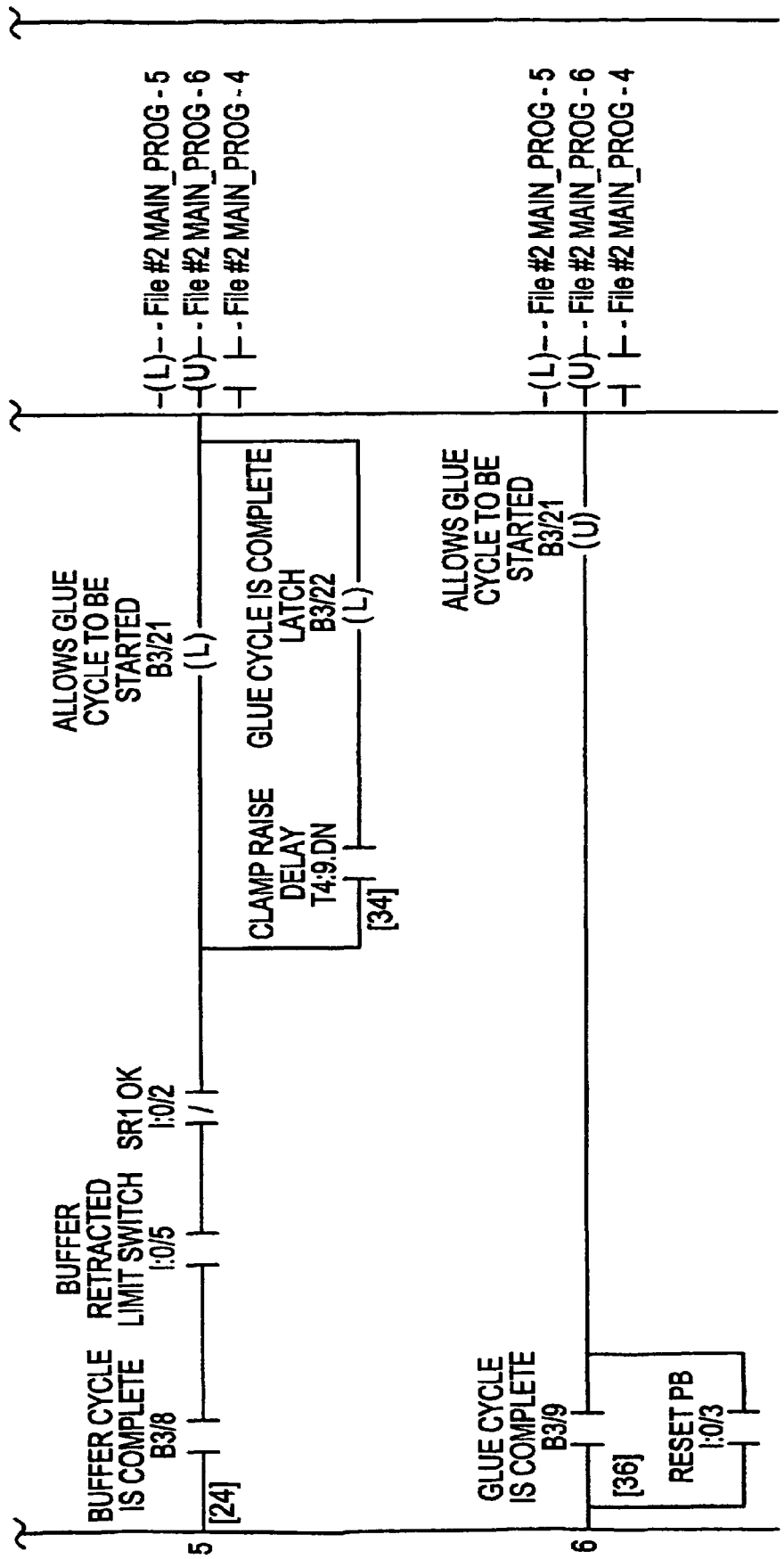
Figure 16A:
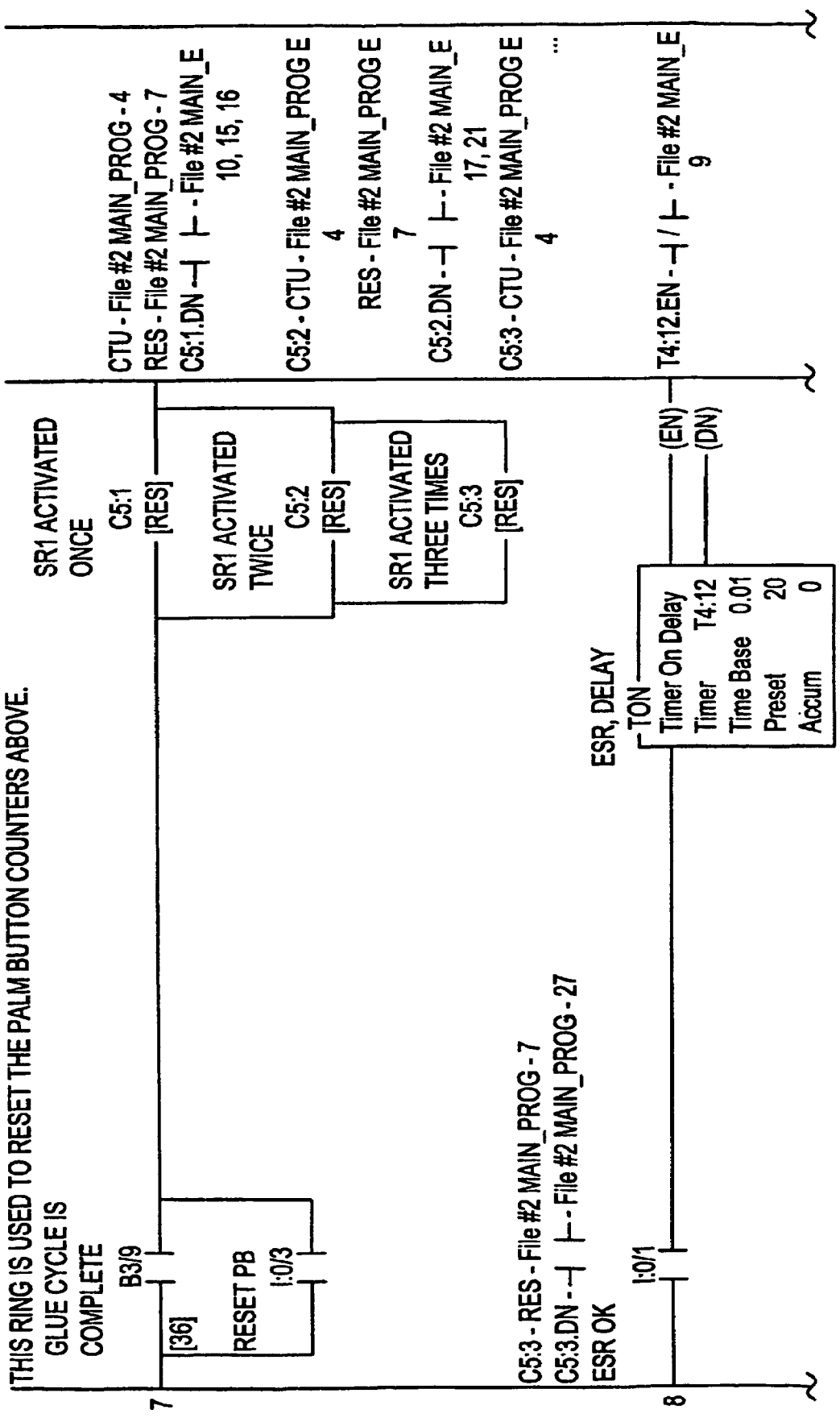
Figure 16B:
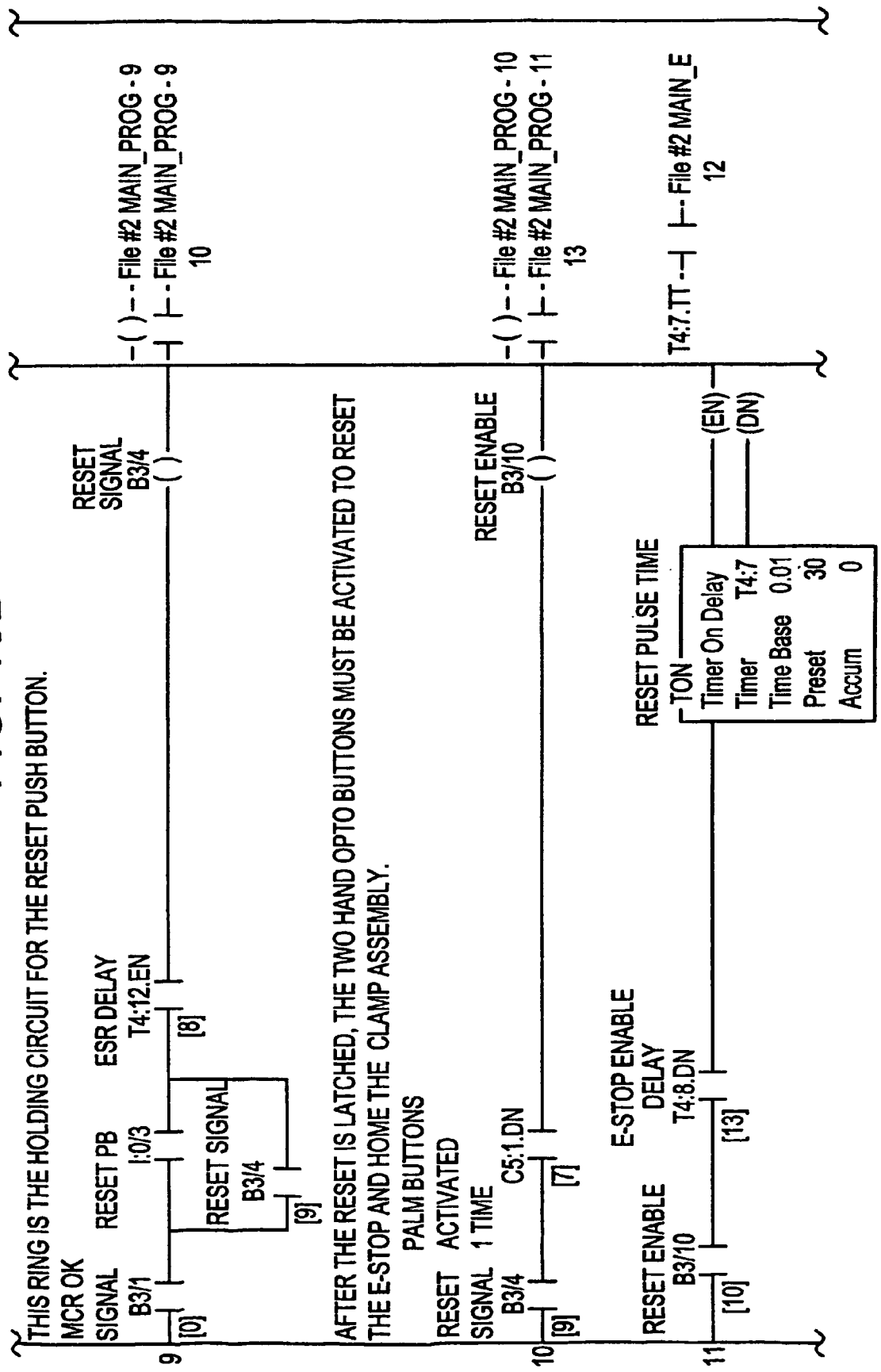
Figure 16C:
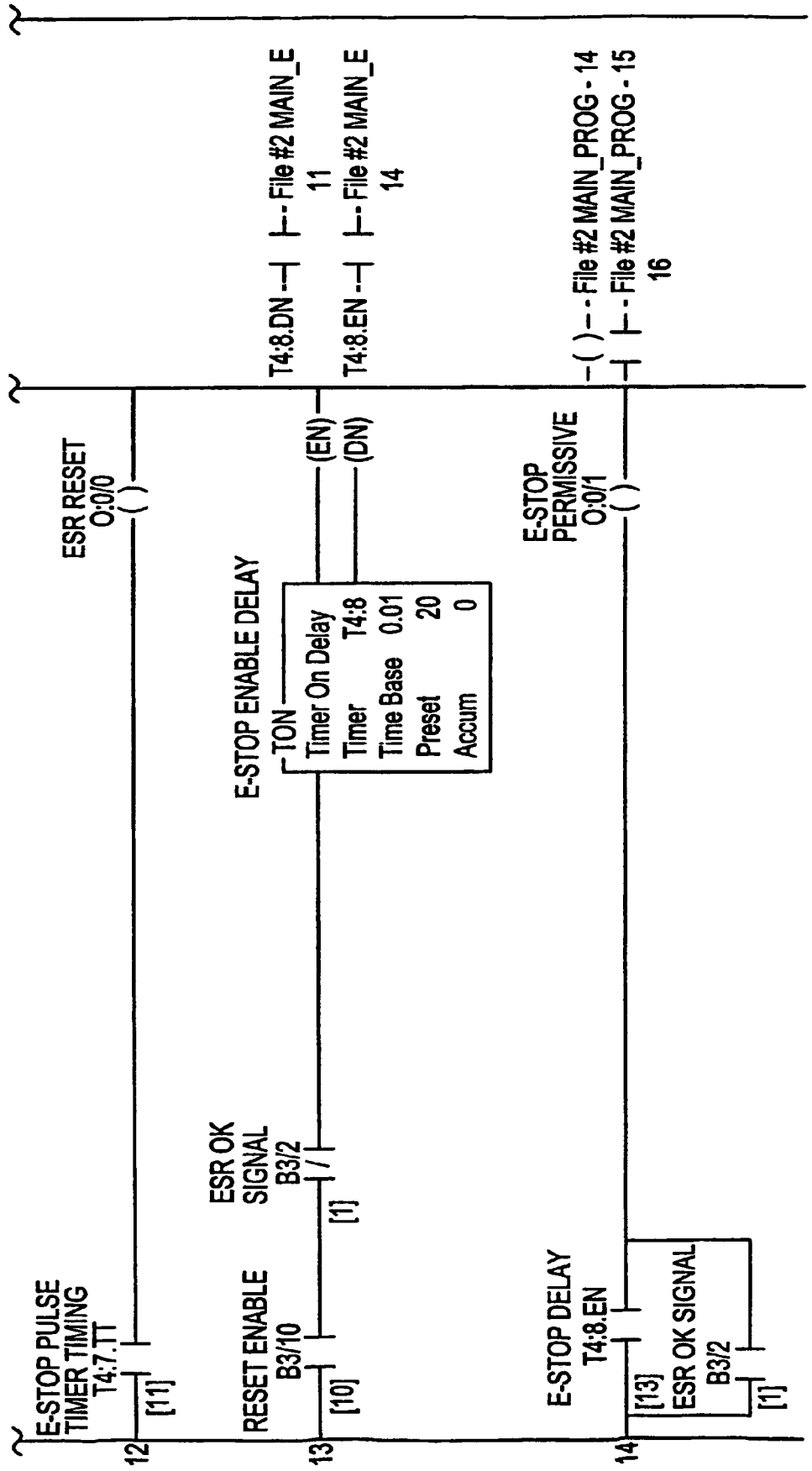
Figure 17A:
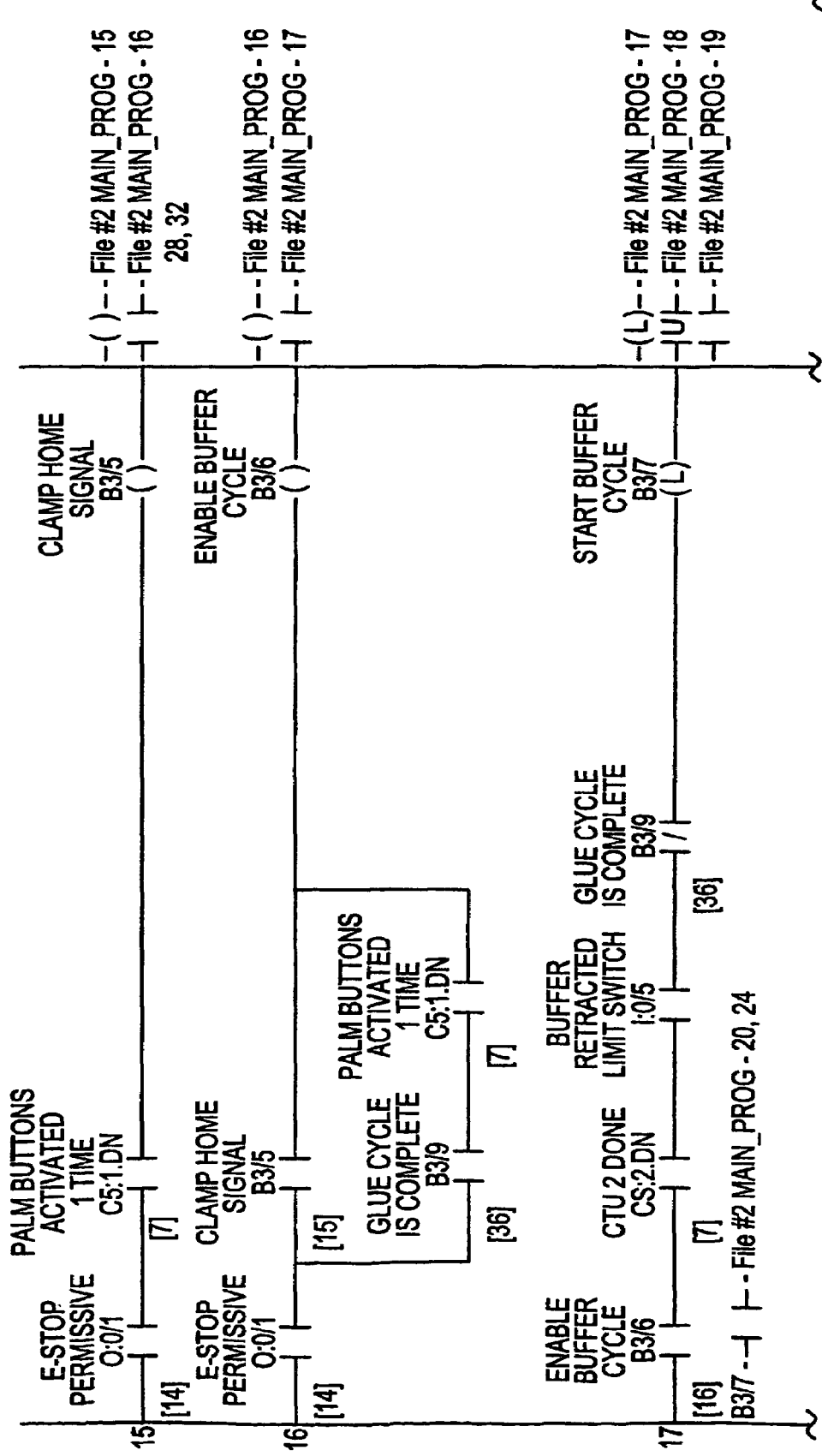
Figure 17B:
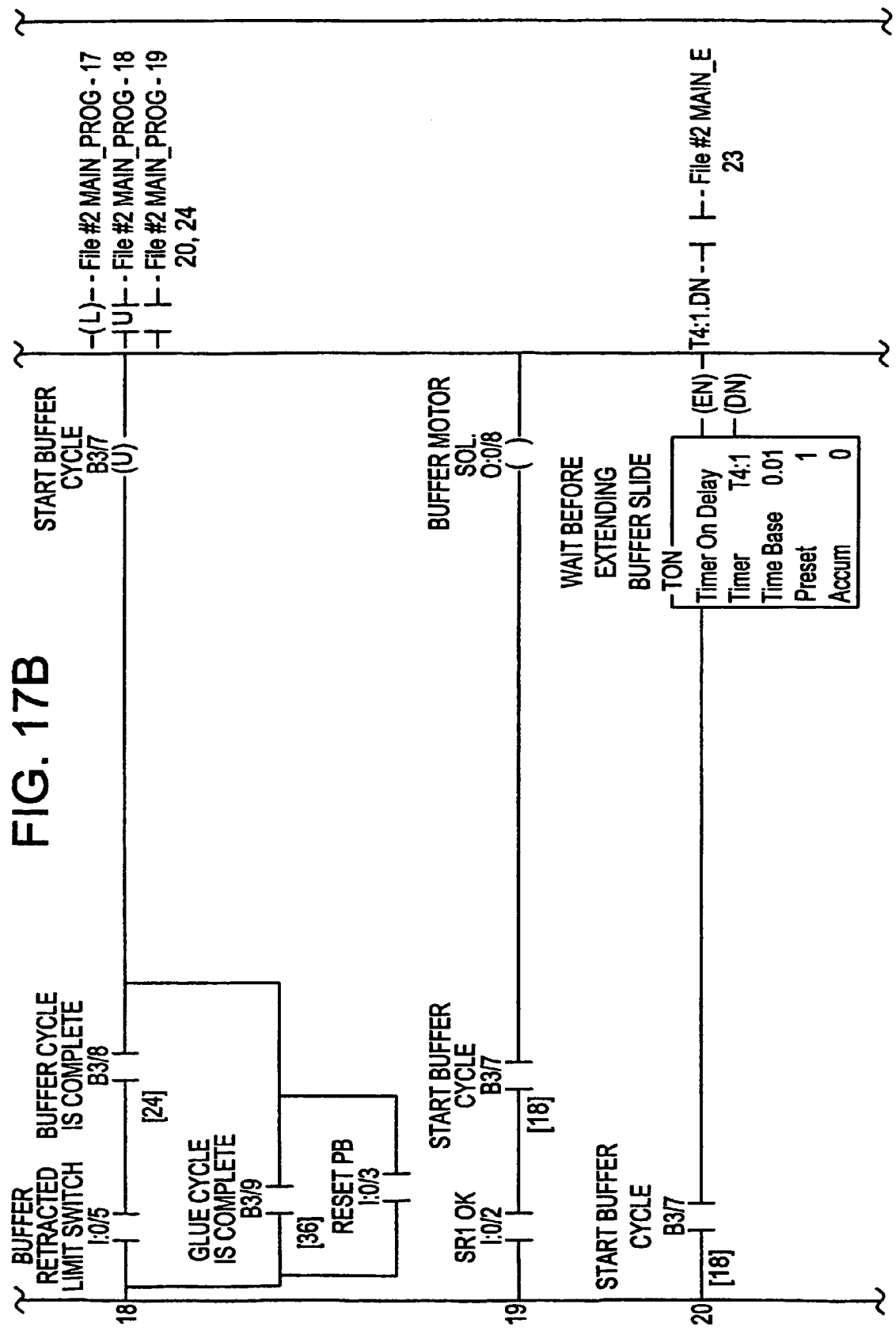
Figure 17C:
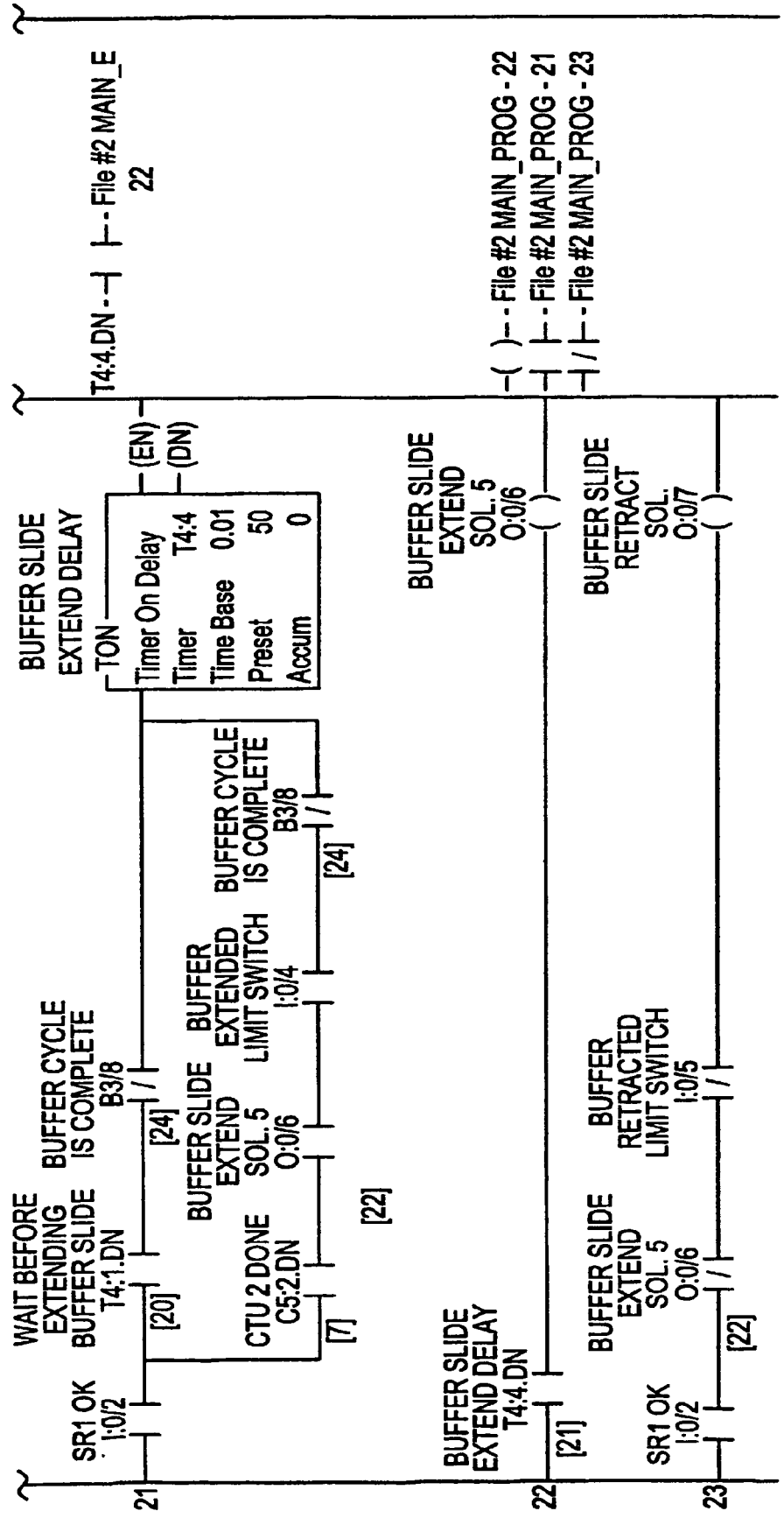
Figure 18A:
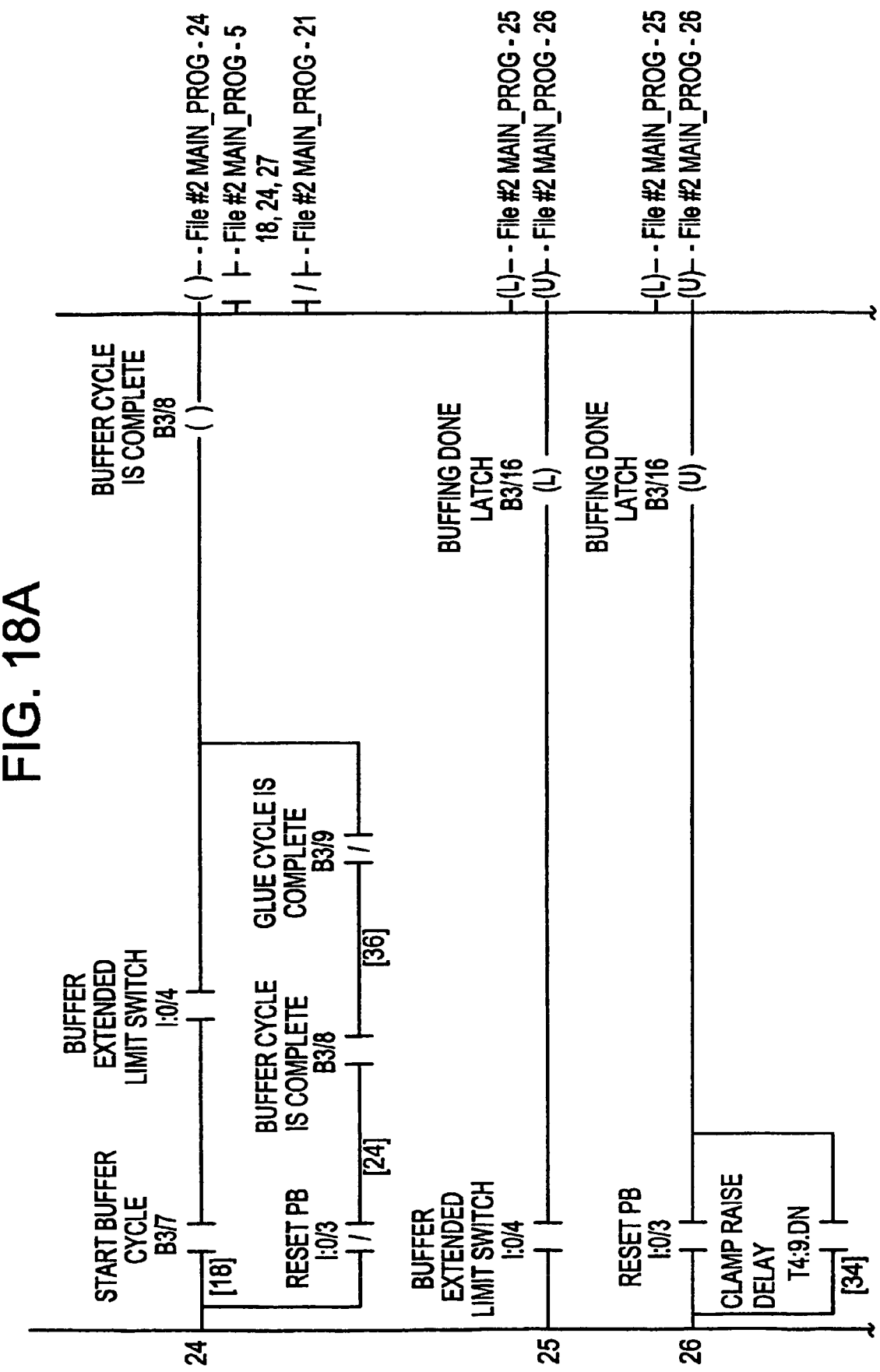
Figure 18B:
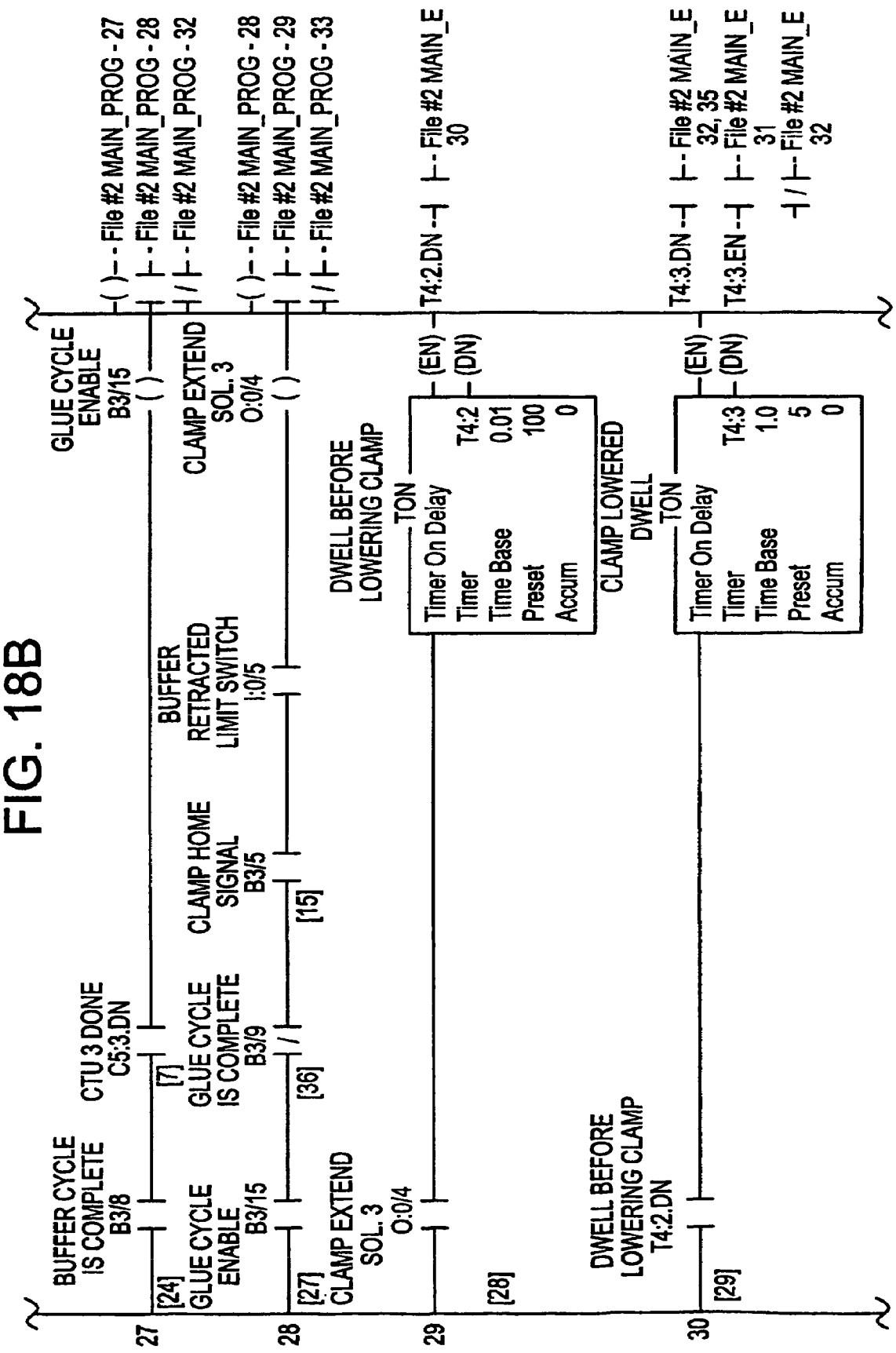
Figure 18C:
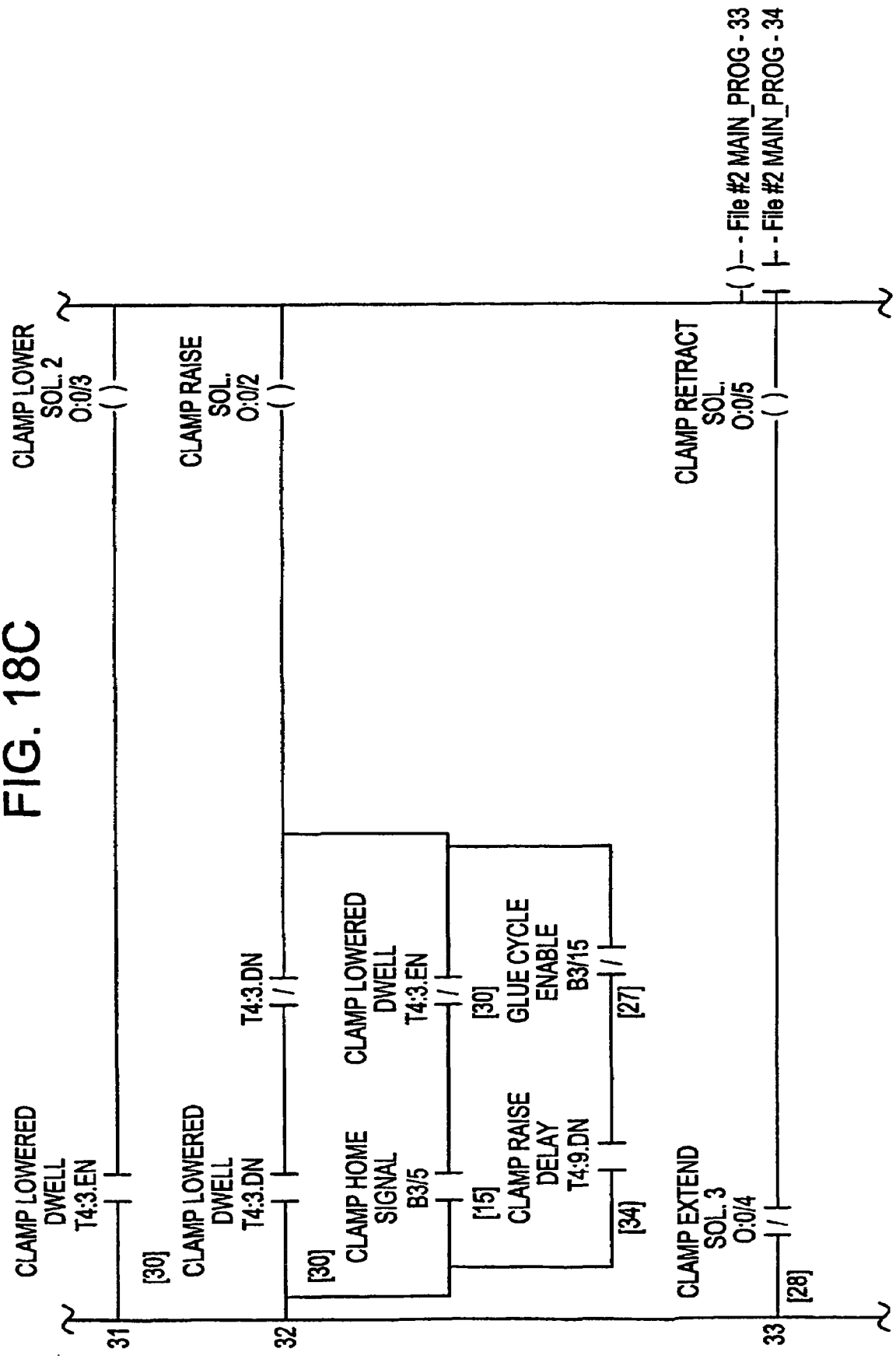
Figure 19:
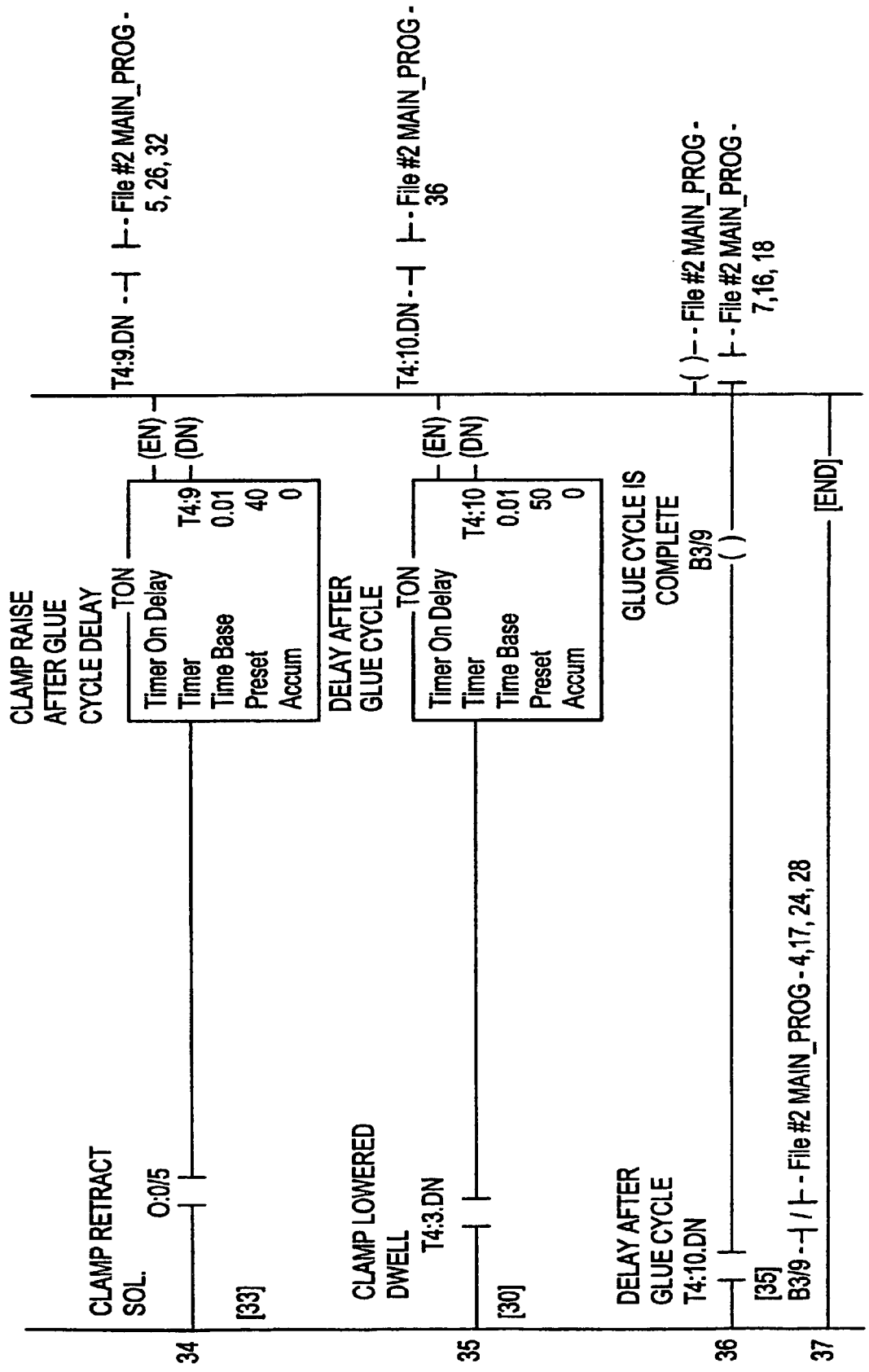

On the left side of FIG. 14 is a power supply control circuit, including manually operated Right & Left optical switches (LOS & ROS) which must be actuated simultaneously to initiate an operating cycle. The physical spaced apart location of these is shown in FIGS. 2 and 3. Normally (and in this case) these switches are operated by an operator placing right and left index fingers in the switch housings. The angularly mounted box 130, to the left and behind slide way 90, houses the manually operated switches marked control power ON, power OFF, and cycle reset CR The hand (palm) actuated switch ER is an emergency stop switch that, when actuated by the operator, causes all air pressure in the system to be dumped, immediately disabling and stopping the apparatus.

FIG. 14 also illustrates (right side) the pin connections for the microprocessor, and the related notations identify the mechanical functions of the apparatus which are under this control. FIGS. 15–19 together illustrate sequential step-by-step control functions of the processor. The notations on these drawings provide a fill description of the control system in detail which is sufficient to fully describe the same in detail sufficient to allow one skilled in this art to reproduce the system.

Set Up of the Apparatus

Each time a new part is to be assembled, tooling corresponding to the hose and clamp of the part must be affixed to the assembly apparatus. These include a mandrel, clamp receiver/carrier, and hose locating tool. In addition, the height of the scrubber and adhesive nozzle must be adjusted to new elevations dictated by the job specification. The timing of the opening of the solenoid glue dispenser valve 85 is set into the processor control to achieve the desired size of glue "spot" for the particular job. The apparatus is slowly moved through an initial cycle with a hose and a clamp in place, and the alignment of mandrel 40 and the clamp holders 32A, 32B are adjusted as necessary, then these parts are tightened into position. The height of glue nozzle is adjusted to assure the glue "spot" will be properly placed on the end of the hose, and the scrubber functions is visibly checked for accuracy of its alignment and action on the hose end where the "spot" is to be placed. The processor is adjusted for the desired time the clamping action is maintained, and for the response time of the emergency stop (air pressure dump) operation. Once these adjustments are complete, the operator may begin assembly operation.

In a fully automatic mode, to run the desired quantity of a job order the operator has only to supply a hose and a clamp into the tooling (alignment is assured by the placement of the tooling), initiate the operating cycle using the two optical switches, and remove the hose-clamp assembly when the cycle is finished. The system is also capable of operating in a semi-automatic mode, wherein the operation of glue spot deposit is controlled by a foot treadle actuated switch TS (FIGS. 2 & 3) which is then connected independently of the automatic cycle controller. In that case, the apparatus functions up to the point where the control is ready to actuate the glue spot valve, and then halts. When the operator actuates the treadle switch, the solenoid valve 80 opening is initiated, and the apparatus completes the cycle.

The method described, and the forms of apparatus for effecting this method, constitute preferred embodiments of this invention, but the invention is not limited to this method and apparatus. Changes may be made in either without departing from the scope of the invention.

What is claimed is:

1. An apparatus for locating a hose for attachment of a clamp at an attachment location on the hose, the apparatus comprising:
   clamp tooling to orient the clamp and to receive and present the clamp in an attachment position;
   a mounting device for receiving the clamp tooling;
   cooperating hose positioning tooling to support the hose when aligned with the clamp and to locate the hose with the attachment location aligned with the clamp;
   a scrubbing tool for scrubbing the attachment location on the hose;
   an adhesive dispenser for depositing a measured quantity of an adhesive to the attachment location;
   a moving device for moving the clamp into engagement with the adhesive deposited at the attachment location on the hose; and
   a pressing device for pressing the clamp and the hose together at the attachment location while the adhesive sets.

2. The apparatus as defined in claim 1, further including a control system for operating the clamp tooling, the cooperating hose positioning tooling, the adhesive dispenser, and the pressing system to automatically join the clamp and the hose once loaded into the apparatus.

3. The apparatus as defined in claim 1, wherein the cooperating hose positioning tooling includes a receptor corresponding to the hose and a mount to locate the attachment location of the hose into alignment with the clamp in the clamp tooling.

4. The apparatus as defined in claim 1, wherein the adhesive dispenser is movably supported adjacent to the clamp tooling and includes a nozzle connected to a supply of the adhesive for applying the measured quantity of the adhesive to the attachment location on the hose, and the apparatus further includes a depositing adhesive moving system for moving the depositing system between a retracted position spaced from the hose and an application position in which the nozzle is closely spaced from the attachment location of the hose.

5. The apparatus as recited in claim 1 wherein the clamp tooling includes a central cylindrical opening having a counterbored opening, wherein the counterbored opening recieves the clamp.

6. The apparatus as recited in claim 1 wherein the scrubbing tool includes an array of fibers, wherein the array of fibers are made of carbon impregnated silicone strands.

7. The apparatus as recited in claim 1 wherein the adhesive dispenser includes a solenoid operated valve and a tapered nozzle, wherein the solenoid operated valve controls a flow of the adhesive through the tapered nozzle and onto the attachment location on the hose.

8. The apparatus as recited in claim 1 wherein the scrubbing tool and the adhesive dispenser are both horizontally and vertically moveable.

9. The apparatus as recited in claim 1 further including an adhesive reservoir that contains the adhesive deposited by the adhesive dispenser.

10. The apparatus as recited in claim 1 further including a table.

11. The apparatus as recited in claim 10 wherein the cooperating hose positioning tooling includes a base secured to the table and a hose receptor that receives the hose.

12. The apparatus as recited in claim 10 wherein the mounting device includes a base plate attached to the table and a post attached to the base plate.

13. The apparatus as recited in claim 12 wherein the mounting device includes a mandrel mounted on the post, wherein the mandrel includes a nose that receives an end portion of the hose and a stop ring that defines an index point for positioning the end portion of the hose.

14. The apparatus as recited in claim 12 wherein the mounting device includes a plate moveable relative to the post, and the clamp tooling is attached to the plate.

15. The apparatus as recited in claim 14 wherein the mounting device includes a vertical positioning mechanism, and actuation of the vertical positioning mechanism moves the plate and the clamp tooling in a vertical direction, and the clamp tooling is moveable between an upper position wherein the clamp is spaced from the hose and a lower position wherein the clamp is pressed against the adhesive on the hose.

16. The apparatus as recited in claim 14 wherein the mounting device includes a horizontal positioning mechanism that moves the plate and the clamp tooling in a horizontal direction.

17. The apparatus as recited in claim 16 wherein the horizontal positioning mechanism is a pneumatic cylinder.

18. The apparatus as recited in claim 17 wherein the vertical positioning mechanism is a pneumatic cylinder.

19. An apparatus for locating a hose for attachment of a clamp at an attachment location on the hose, the apparatus comprising:

clamp tooling to orient the clamp and to receive and present the clamp in an attachment position;

a mounting device for receiving the clamp tooling;

cooperating hose positioning tooling to support the hose when aligned with the clamp and to locate the hose with the attachment location aligned with the clamp, wherein the cooperating hose positioning tooling includes a receptor corresponding to the hose and a mount to locate the attachment location of the hose into alignment with the clamp in the clamp tooling;

a scrubbing tool for scrubbing the attachment location on the hose, wherein the scrubbing tool is movably supported adjacent to the clamp tooling, and the scrubbing tool includes an abrading tool for preparing the attachment location on the hose;

an abrading tool moving system for moving the abrading tool between a retracted position spaced from the hose and a scrubbing position in contact with the attachment location of the hoses;

an adhesive dispenser for depositing a measured quantity of an adhesive to the attachment location;

a moving device for moving the clamp into engagement with the adhesive deposited at the attachment location on the hose; and a pressing device for pressing together the clamp and the hose at the attachment location while the adhesive sets.

* * * * *

UNITED STATES PATENT AND TRADEMARK OFFICE
CERTIFICATE OF CORRECTION

PATENT NO. : 7,111,389 B2 Page 1 of 1
APPLICATION NO. : 10/182171
DATED : September 26, 2006
INVENTOR(S) : Cooper et al.

It is certified that error appears in the above-identified patent and that said Letters Patent is hereby corrected as shown below:

Column 8, line 20: "hoses" should be --hose--

Signed and Sealed this

Ninth Day of January, 2007

JON W. DUDAS
*Director of the United States Patent and Trademark Office*